United States Patent
Sugawara et al.

(10) Patent No.: US 7,242,516 B2
(45) Date of Patent: Jul. 10, 2007

(54) HARD MAGNETIC GARNET MATERIAL, FARADAY ROTATOR, OPTICAL DEVICE, OPTICAL COMMUNICATION SYSTEM, METHOD OF MANUFACTURING FARADAY ROTATOR AND METHOD OF MANUFACTURING BISMUTH-SUBSTITUTED RARE EARTH IRON GARNET SINGLE CRYSTAL

(75) Inventors: Tamotsu Sugawara, Tokyo (JP); Atsushi Ohido, Tokyo (JP); Kazuhito Yamasawa, Tokyo (JP)

(73) Assignee: TDK Corporation, Tokyo (JP)

( * ) Notice: Subject to any disclaimer, the term of this patent is extended or adjusted under 35 U.S.C. 154(b) by 273 days.

(21) Appl. No.: 10/791,598

(22) Filed: Mar. 2, 2004

(65) Prior Publication Data

US 2004/0168628 A1 Sep. 2, 2004

Related U.S. Application Data

(62) Division of application No. 10/328,966, filed on Dec. 24, 2002, now Pat. No. 6,775,052.

(30) Foreign Application Priority Data

Dec. 25, 2001 (JP) .............................. 2001-392630
Dec. 28, 2001 (JP) .............................. 2001-399276
Feb. 15, 2002 (JP) .............................. 2002-038621

(51) Int. Cl.
*G02F 1/00* (2006.01)
*G02F 1/09* (2006.01)

(52) U.S. Cl. ....................................... 359/324; 359/280

(58) Field of Classification Search ........ 359/280–283, 359/321, 324, 484, 495
See application file for complete search history.

(56) References Cited

U.S. PATENT DOCUMENTS 5,898,516 A * 4/1999 Shirai et al. ................ 359/324

FOREIGN PATENT DOCUMENTS

| JP | 63-212901 | 9/1988 |
|---|---|---|
| JP | 06-222311 | 8/1994 |
| JP | 09-185027 | 7/1997 |
| JP | 09-328398 | 12/1997 |
| JP | 10-031112 | 2/1998 |
| JP | 10-142558 | 5/1998 |
| JP | 2000-075244 | 3/2000 |
| JP | 2000-180791 | 6/2000 |
| JP | 2000-298247 | 10/2000 |
| JP | 2001-311851 | 11/2001 |
| JP | 2002-287104 | 10/2002 |

* cited by examiner

*Primary Examiner*—Ricky Mack
*Assistant Examiner*—William Choi
(74) *Attorney, Agent, or Firm*—Hogan & Hartson LLP

(57) ABSTRACT

A hard magnetic Bi-substituted rare earth iron garnet material with excellent Faraday rotary moment, temperature property, wavelength property and insertion loss is provided. A Bi-substituted rare earth iron garnet material having a chemical composition of $(Bi_{3-a-b-c}Gd_aTb_bYb_c)Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$) can be provided with hard magnetism and have excellent Faraday rotary moment, temperature property, wavelength property and insertion loss.

7 Claims, 14 Drawing Sheets

FORWARD DIRECTION →

MAGNETIC FIELD APPLICATION DIRECTION →

Prior Art

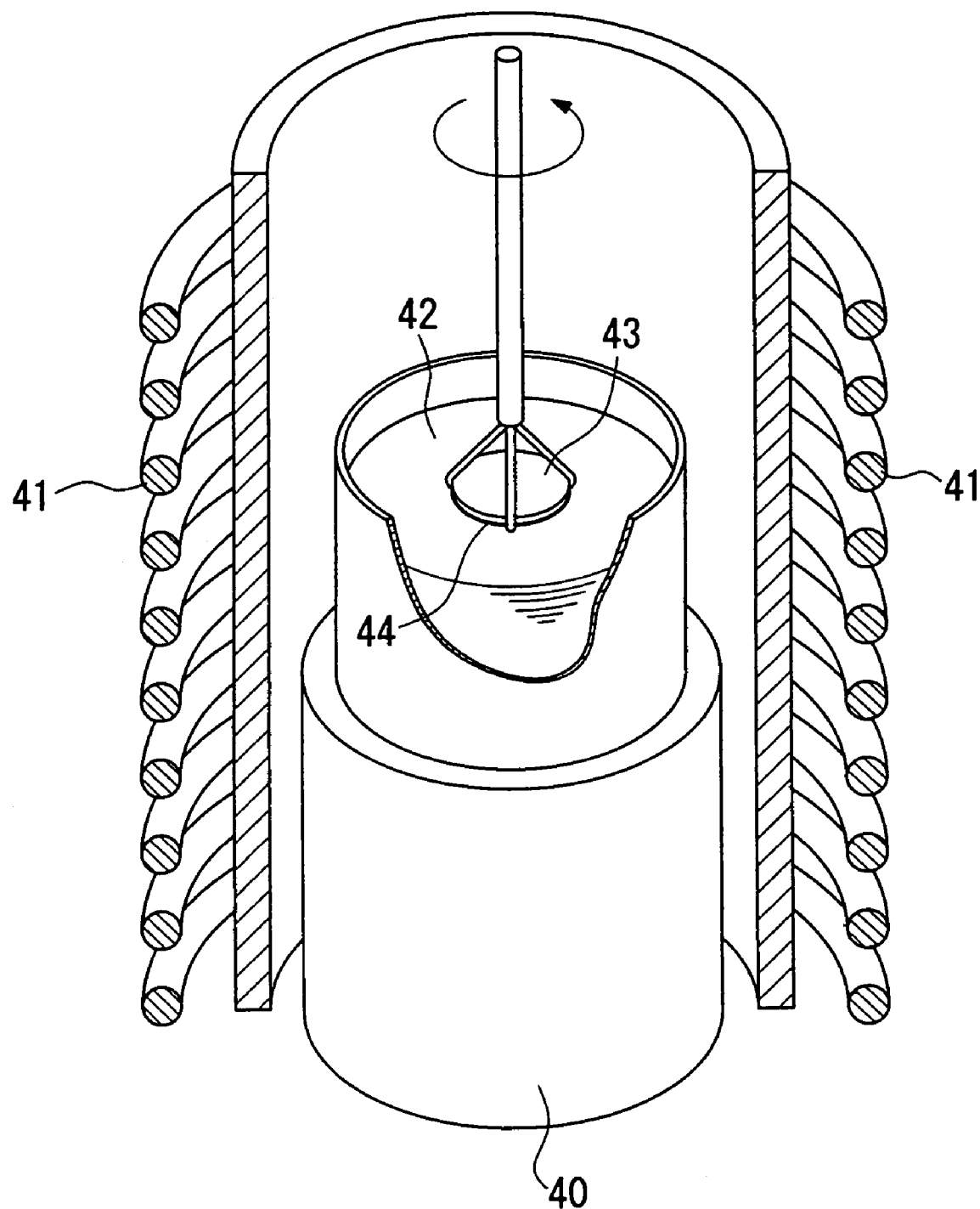

FIG. 9

| SAMPLE No. | CHEMICAL COMPOSITION | ROTARY MOMENT (°/cm) | TEMPERATURE PROPERTY (%) (°/°C) | WAVELENGTH PROPERTY (%) (°/nm) | INSERTION LOSS (dB) | MAGNETIC TYPE | REMARKS |
|---|---|---|---|---|---|---|---|
| 1 | $Bi_{1.0}Gd_{0.4}Tb_{1.2}Yb_{0.4}Fe_{4.0}Ga_{1.0}O_{12}$ | 800 | 10.8 / 0.078 | 6.8 / 0.061 | 0.07 | HARD MAGNETIC | PRESENT INVENTION |
| 2 | $Bi_{1.2}Tb_{1.4}Y_{0.4}Fe_{3.8}Ga_{1.2}O_{12}$ | 950 | 11.8 / 0.085 | 6.8 / 0.061 | 0.12 | HARD MAGNETIC | COMPARATIVE EXAMPLE (CONTAINING NO Gd) |
| 3 | $Bi_{1.2}Gd_{1.2}Yb_{0.6}Fe_{3.9}Ga_{1.1}O_{12}$ | 950 | 13.9 / 0.100 | 8.3 / 0.075 | 0.02 | HARD MAGNETIC | COMPARATIVE EXAMPLE (CONTAINING NO Tb) |
| 4 | $Bi_{0.7}Gd_{1.1}Tb_{1.2}Fe_{4.2}Ga_{0.8}O_{12}$ | 650 | 10.4 / 0.075 | 6.8 / 0.061 | 0.07 | HARD MAGNETIC | COMPARATIVE EXAMPLE (CONTAINING NO Yb) |
| 5 | $Bi_{1.2}Gd_{1.8}Fe_{4.0}Ga_{0.5}Al_{0.5}O_{12}$ | 800 | 11.8 / 0.085 | 8.2 / 0.074 | 0.07 | HARD MAGNETIC | JAPANESE PATENT LAID-OPEN No. 6-222311 |
| 6 | $Bi_{1.0}Eu_{2.0}Fe_{4.0}Ga_{0.5}Al_{0.5}O_{12}$ | 800 | 13.9 / 0.100 | 8.3 / 0.075 | 0.04 | HARD MAGNETIC | JAPANESE PATENT LAID-OPEN No. 9-185027 |
| 7 | $Bi_{1.37}Tb_{1.83}Fe_{4.0}Ga_{0.84}Al_{0.15}O_{12}$ | 1050 | 10.0 / 0.072 | 6.7 / 0.060 | 0.11 | HARD MAGNETIC | JAPANESE PATENT LAID-OPEN No. 9-328398 |
| 8 | $Bi_{1.48}Tb_{1.08}Ho_{0.44}Fe_{4.09}Ga_{0.77}Al_{0.14}O_{12}$ | 1100 | 15.3 / 0.110 | 6.9 / 0.062 | 0.09 | HARD MAGNETIC | JAPANESE PATENT LAID-OPEN No. 10-31112 |
| 9 | $Bi_{1.0}Gd_{0.3}Tb_{1.4}Yb_{0.3}Fe_{4.3}Ga_{0.7}O_{12}$ | 920 | 9.7 / 0.072 | 6.7 / 0.060 | 0.07 | HARD MAGNETIC | PRESENT INVENTION |

FIG. 10

| SAMPLE No. | CHEMICAL COMPOSITION | ROTARY MOMENT (°/cm) | TEMPERATURE PROPERTY (%) | TEMPERATURE PROPERTY (°/°C) | WAVELENGTH PROPERTY (%) | WAVELENGTH PROPERTY (°/nm) | INSERTION LOSS (dB) | MAGNETIC TYPE | REMARKS |
|---|---|---|---|---|---|---|---|---|---|
| 1 | $Bi_1Gd_{0.4}Tb_{1.2}Yb_{0.4}Fe_{4.0}Ga_{1.0}O_{12}$ | 800 | 10.8 | 0.078 | 6.8 | 0.061 | 0.07 | HARD MAGNETIC | PRESENT INVENTION (LARGE AMOUNT OF Tb) |
| 10 | $Bi_{1.1}Gd_{0.9}Tb_{0.7}Yb_{0.3}Fe_{4.0}Ga_{1.0}O_{12}$ | 850 | 11.4 | 0.082 | 7.1 | 0.064 | 0.04 | HARD MAGNETIC | PRESENT INVENTION (LARGE AMOUNT OF Gd) |
| 11 | $Bi_{1.2}Gd_{0.5}Tb_{0.8}Yb_{0.5}Fe_{4.0}Ga_{1.0}O_{12}$ | 950 | 11.8 | 0.085 | 7 | 0.063 | 0.06 | HARD MAGNETIC | PRESENT INVENTION (LARGE AMOUNT OF Bi) |
| 12 | $Bi_{1.1}Gd_{0.6}Tb_{0.9}Yb_{0.4}Fe_{4.9}Ga_{0.1}O_{12}$ | — | — | — | — | — | — | SOFT MAGNETIC | COMPARATIVE EXAMPLE |

FIG. 11

| SAMPLE No. | CHEMICAL COMPOSITION | ROTARY MOMENT (°/cm) | TEMPERATURE PROPERTY (%) | TEMPERATURE PROPERTY (°/°C) | WAVELENGTH PROPERTY (%) | WAVELENGTH PROPERTY (°/nm) | INSERTION LOSS (dB) | MAGNETIC TYPE | REMARKS |
|---|---|---|---|---|---|---|---|---|---|
| 13 | $Bi_{1.0}Gd_{0.4}Tb_{1.2}Yb_{0.4}Fe_{4.0}Ga_{0.7}Al_{0.3}O_{12}$ | 800 | 10.8 | 0.078 | 6.8 | 0.061 | 0.07 | HARD MAGNETIC | PRESENT INVENTION |
| 14 | $Bi_{1.2}Gd_{0.4}Tb_{1.2}Yb_{0.4}Fe_{4.0}Ga_{0.8}Ge_{0.1}Sc_{0.1}O_{13}$ | 950 | 11.1 | 0.080 | 6.9 | 0.062 | 0.07 | HARD MAGNETIC | PRESENT INVENTION |
| 15 | $Bi_{1.2}Gd_{0.4}Tb_{0.7}Yb_{0.6}Ca_{0.1}Fe_{4.2}Al_{0.5}In_{0.2}Si_{0.1}O_{14}$ | 950 | 11.8 | 0.085 | 7.0 | 0.063 | 0.06 | HARD MAGNETIC | PRESENT INVENTION |
| 16 | $Bi_{0.9}Gd_{0.7}Tb_{0.7}Yb_{0.3}Sn_{0.2}Eu_{0.2}Fe_{4.5}Ga_{0.4}Ti_{0.1}O_{12}$ | 770 | 12.2 | 0.088 | 7.2 | 0.065 | 0.10 | HARD MAGNETIC | PRESENT INVENTION |
| 17 | $Bi_{1.0}Gd_{0.7}Tb_{0.5}Yb_{0.5}Dy_{0.3}Lu_{0.2}Fe_{4.0}Ga_{1.0}O_{12}$ | 800 | 11.8 | 0.085 | 7.2 | 0.065 | 0.09 | HARD MAGNETIC | PRESENT INVENTION |
| 18 | $Bi_{0.9}Gd_{0.9}Tb_{0.7}Yb_{0.4}Tm_{0.3}Fe_{4.1}Ga_{0.9}O_{12}$ | 770 | 11.1 | 0.080 | 7.2 | 0.065 | 0.095 | HARD MAGNETIC | PRESENT INVENTION |
| 19 | $Bi_{1.1}Gd_{0.6}Tb_{0.9}Yb_{0.2}Er_{0.2}Fe_{4.3}Ga_{0.7}O_{12}$ | 850 | 11.1 | 0.080 | 7.1 | 0.064 | 0.09 | HARD MAGNETIC | PRESENT INVENTION |
| 20 | $Bi_{1.0}Gd_{0.4}Tb_{1.1}Yb_{0.3}Ho_{0.2}Fe_{4.2}Ga_{0.8}O_{12}$ | 800 | 10.8 | 0.078 | 6.9 | 0.062 | 0.07 | HARD MAGNETIC | PRESENT INVENTION |
| 21 | $Bi_{0.9}Gd_{1.1}Tb_{0.8}Yb_{0.2}Y_{0.1}Fe_{4.6}Ga_{0.4}O_{12}$ | 770 | 11.1 | 0.080 | 7.0 | 0.063 | 0.07 | HARD MAGNETIC | PRESENT INVENTION |

SECTION OF A SAMPLE CUT BY WIRE SAW

SECTION OF A SAMPLE CUT BY DICING MACHINE

HARD MAGNETIC GARNET MATERIAL, FARADAY ROTATOR, OPTICAL DEVICE, OPTICAL COMMUNICATION SYSTEM, METHOD OF MANUFACTURING FARADAY ROTATOR AND METHOD OF MANUFACTURING BISMUTH-SUBSTITUTED RARE EARTH IRON GARNET SINGLE CRYSTAL

This is a divisional of application Ser. No. 10/328,966 filed Dec. 24, 2002 now U.S. Pat. No. 6,775,052, which application is hereby incorporated by reference in its entirety.

BACKGROUND OF THE INVENTION

1. Field of the Invention

The present invention relates to a hard magnetic garnet material used for an optical communication system, a Faraday rotator, a method of manufacturing a Faraday rotator and a method of manufacturing a Bismuth-substituted rare earth iron garnet single crystal. The present invention also relates to an optical device using a Faraday rotator and an optical communication system provided with an optical device.

2. Description of the Related Art

Optical communications are currently becoming widespread at an increasing speed in contrast to telecommunications with small transmission capacity. As will be explained later, reasons may be summarized as follows: Optical communication allows, large volume transmission at high-speed, is advantageous in long-distance transmission because it requires fewer relays and is free of influences from electromagnetic noise.

Light is same as a radio wave used for TV or radio broadcasting or wireless communications in the sense that it is an electromagnetic wave. However, frequency of an electromagnetic wave used in optical communications is approximately 200 THz, equivalent to approximately 20000 times that of satellite broadcasting (approximately 10 GHz). Having a high frequency means having a short wavelength and being able to transmit more signals at high speed all the more. By the way, a wavelength (central wavelength) used in optical communications is 1.31 μm (1310 nm) and 1.55 μm (1550 nm).

As is well known, an optical fiber used for optical communications has a double structure of glass pieces of different refractive indices. Since light passing through the central core is repeatedly reflected inside the core, signals are transmitted correctly even if the optical fiber is curved. Moreover, since highly transparent, high purity silica glass is used for the optical fiber, optical communication attenuates only by approximately 0.2 dB per km. Accordingly, optical communications allow transmission of approximately 100 km without amplifiers and allows the number of relays to be reduced compared to telecommunications.

EMI (electromagnetic interference) becomes an issue in telecommunications, while communications using optical fibers are free of noise by electromagnetic induction, which allows information transmission with extremely high quality.

A current optical communication system converts an electric signal to an optical signal using an LD (laser diode) in an optical transmitter, transmits this optical signal through optical fibers and converts the optical signal to an electric signal using a PD (photodiode) in an optical receiver. Thus, elements essential to an optical communication system are LD, PD, optical fibers and optical connectors. Except for a relatively low-speed, short-distance communication system, a high-speed, long-distance communication system also requires, in addition to these device, optical transmission devices such as light amplifier and optical distributor, optical parts applied to these devices such as optical isolator, optical coupler, optical splitter, optical switch, optical modulator, optical attenuator, etc.

What plays a particularly important role in a high-speed, long-distance transmission or a multi-branched optical communication system is an optical isolator. In a current optical communication system, optical isolators are used in LD modules of an optical transmitter and relays. The optical isolator is an optical part that plays a role in transmitting electromagnetic waves only in one direction and blocking electromagnetic waves which are reflected at some midpoint and return. The optical isolator applies a Faraday effect which is a kind of magneto-optical effects. The Faraday effect refers to a phenomenon of rotation of the polarization plane of light which has passed through materials exhibiting a Faraday effect, that is, a Faraday rotator using such as rare earth iron garnet single crystal. The characteristic that the polarization direction of light rotates such as the Faraday effect is called "optical rotary power". Unlike normal optical rotary power, in the case of the Faraday effect, even if the light propagation direction is reversed, the original condition is not restored, but the polarization direction further rotates. An element using the phenomenon that the polarization direction of light rotates due to the Faraday effect is called a "Faraday rotator".

The function of the optical isolator will be explained taking an LD module as an example.

An LD is built in an optical transmitter as an LD module integrated with an optical fiber. The optical isolator is placed between the LD and optical fiber and has the function of preventing reflected light from returning to the LD using the Faraday effect. Reflected returning light refers to light which is emitted from the LD, slightly reflected by components such as optical connectors and returned. Reflected returning light causes noise to the LD. The optical isolator that lets light pass in only one direction eliminates this noise and maintains communication quality.

In the case of the LD in the optical transmitter, the vibration direction (polarization direction) of light emitted from the LD is determined to be only one direction, and therefore a polarization-dependent type optical isolator of a simple structure is used. FIG. 6 shows a basic configuration of a conventional polarization-dependent type optical isolator 10. The optical isolator 10 is comprised of a Faraday rotator 11 constructed of a garnet single crystal, a cylindrical permanent magnet 12 that surrounds the Faraday rotator 11 and magnetizes the Faraday rotator 11 and polarizers 13 and 14 that are placed at the front and back surfaces of the Faraday rotator 11. These polarizers 13 and 14 are placed at a relative angle of 45°. With the optical isolator 10, the direction in which light propagates will be called a "forward direction", while the direction in which light is reflected and returned will be called a "backward direction".

Then, the mechanism whereby the optical isolator 10 blocks passage of light in the backward direction will be explained. FIG. 7A shows how light in the forward direction passes through the optical isolator 10, while FIG. 7B shows how light in the backward direction is prevented from passing through the optical isolator 10.

As shown in FIG. 7A, linearly polarized light that has passed through the polarizer 13 in the forward direction is rotated 45° by the Faraday rotator 11 and passes through the polarizer 14 placed at a relative angle of 45°. On the other hand, as shown in FIG. 7B, in the backward direction, linearly polarized light that has passed through the polarizer 14 is further rotated 45° by the Faraday rotator 11, and therefore the light cannot pass through the polarizer 13.

The polarization-dependent optical isolator 10 used-for the LD module has been explained above. On the other hand, a polarization-independent optical isolator is also available, such as an optical isolator used for a light amplifier. In the case of a light amplifier, light from an optical fiber enters directly into the optical isolator, and so it is not possible to identify the polarization direction. For this reason, a polarization-independent optical isolator has been developed. The basic configuration thereof is well known and therefore explanations thereof will be omitted here. When the present invention simply refers to an "optical isolator", it has a concept including both the polarization-dependent and polarization-independent types.

The Faraday rotator affects the performance of the optical isolator. Therefore, the properties of materials composing the Faraday rotator are important factors in attaining a high performance optical isolator. The important factors in selecting materials composing the Faraday rotator include having large Faraday rotation angle with the wavelength used (1.31 μm, 1.55 μm in the case of optical fiber) and having high-level transparency. As a material satisfying these conditions, YIG (yttrium iron garnet: $Y_3Fe_5O_{12}$) was used initially, but it was insufficient in terms of mass production and miniaturization.

Then, it was discovered that when a rare earth site of a garnet single crystal was substituted by bismuth (Bi), the Faraday rotary moment was improved drastically, and since then this Bi-substituted rare earth iron garnet single crystal came into use for the Faraday rotator.

SUMMARY OF THE INVENTION

By the way, the conventional bismuth-substituted rare earth iron garnet single crystal shows a constant value of Faraday rotation angle in a magnetic field exceeding saturated magnetic field. On the other hand, in a magnetic field lower than the saturated magnetic field, the Faraday rotation angle is proportional to the magnitude of the magnetic field and the Faraday effect disappears when the external magnetic field is removed. Thus, as shown in FIG. 6, the conventional optical isolator 10 would be provided with the permanent magnet 12 to apply a magnetic field greater than saturated magnetic field to the Faraday rotator 11.

For the optical isolator 10, there is also a demand for miniaturization and cost reduction as in the case of other devices and components. However, the presence of this permanent magnet 12 can be said to prevent miniaturization and cost reduction of the optical isolator 10.

Since the Faraday effect disappears when an external magnetic field is removed from the conventional bismuth-substituted rare earth iron garnet single crystal, it can be said to be a soft magnetic material. Therefore, placement of the permanent magnet 12 is indispensable. However, even if hard magnetism is provided for the bismuth-substituted rare earth iron garnet single crystal, that is, if the Faraday rotation angle can be kept therein with removing the external magnetic field, it is possible to omit the placement of the permanent magnet 12. Omission of the permanent magnet 12 will lead to miniaturization and cost reduction of the optical isolator or various devices and components using Faraday effect. Therefore, the development of a hard magnetic bismuth-substituted rare earth iron garnet single crystal is underway.

For example, Japanese Patent Laid-Open No. 6-222311 discloses a bismuth-substituted rare earth iron garnet single crystal grown using an LPE (Liquid Phase Epitaxial) method, the chemical composition of the single crystal being indicated by $Gd_xR_yBi_{3-x-y}Fe_{5-z}(AlGa)_zO_{12}$ (where R is at least one element selected from the group consisting of La, Ce, Pr, Nd, Sm, Eu, Tb, Dy, Er, Tm, Yb, Lu and Y; x, y and z are numbers such as $1.0 \leq x \leq 2.5$, $0 \leq y \leq 1.9$, $0.5 \leq z \leq 2.0$), which maintains the Faraday rotation effect when an external magnetic field is applied in the direction crossing the plane of the single crystal to magnetically saturate the single crystal and then the external magnetic field is removed. It has been proven that when an external magnetic field exceeding saturation magnetization is applied, this single crystal maintains the Faraday rotation angle even if the external magnetic field is removed. However, it is only a $Gd_{1.8}Bi_{1.2}Fe_{4.0}Al_{0.5}Ga_{0.5}O_{12}$ single crystal that is specifically disclosed as this bismuth-substituted rare earth iron garnet single crystal and no other single crystals are disclosed specifically in the Japanese Patent Laid-Open No. 6-222311.

Furthermore, Japanese Patent Laid-Open No. 9-185027 discloses a hard magnetic bismuth-substituted rare earth iron garnet single crystal having the following chemical composition. By the way, Japanese Patent Laid-Open No. 9-185027 points out that inclusion of Gd, Tb and Dy should be avoided.

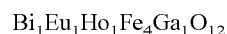
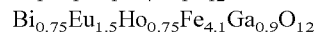

$Bi_1Eu_1Ho_1Fe_4Ga_1O_{12}$ $Bi_{0.75}Eu_{1.5}Ho_{0.75}Fe_{4.1}Ga_{0.9}O_{12}$ $Bi_1Eu_2Fe_4Ga_{0.5}Al_{0.5}O_{12}$

Furthermore, Japanese Patent Laid-Open No. 9-328398 discloses a Faraday rotator obtained by applying a magnetization process to a bismuth-substituted rare earth iron garnet single crystal grown using an LPE method, whose chemical composition is indicated by $Tb_{3-x}Bi_xFe_{5-y-z}Ga_yAl_zO_{12}$ (where $1.1 \leq x \leq 1.5$, $0.65 \leq y+z \leq 1.2$, $z \leq y$) Furthermore, Japanese Patent Laid-Open No. 10-31112 discloses a Faraday rotator obtained by applying a magnetization process to a bismuth-substituted rare earth iron garnet single crystal grown using an LPE method, whose chemical composition is indicated by $Tb_{3-x-y}Ho_xBi_yFe_{5-x-w}Ga_zAl_wO_{12}$ (where $0.40 \leq x \leq 0.70$, $1.30 \leq y \leq 1.55$, $0.7 \leq z+w \leq 1.2$, $0 \leq w/z \leq 0.3$) The Faraday rotators described in Japanese Patent Laid-Open No. 9-328398 and Japanese Patent Laid-Open No. 10-31112 exhibit rectangular hysteresis.

Furthermore, Japanese Patent Laid-Open No. 2000-180791 discloses that an optical isolator having a Faraday rotator with a rectangular magnetic hysteresis is obtained by setting the ratio of a coercive force value to a residual magnetization value to 1.5 or more and thereby suppressing generation of a magnetic domain having reverse magnetization due to a temperature dispersion of magnetic properties and dispersion of magnetic domain wall energy. Japanese Patent Laid-Open No. 2000-180791 further discloses that a coercive force and rectangularity of magnetic hysteresis are improved by applying heat treatment within a range of 600 to 1100° C. to a bismuth-substituted rare earth iron garnet single crystal grown using an LPE method.

As shown above, Laid-Open No. 6-222311, Japanese Patent Laid-Open No. 9-185027 and Japanese Patent Laid-Open No. 9-328398 propose hard magnetic bismuth-substituted rare earth iron garnet single crystals. However, the above described bismuth-substituted rare earth iron garnet single crystals are limited to basic investigation into whether hard magnetism is exhibited or not and have no mention about Faraday rotary moment, temperature property and wavelength property of a Faraday rotation angle or insertion loss required for a Faraday rotator.

On the other hand, the bismuth-substituted rare earth iron garnet single crystal described in Japanese Patent Laid-Open No. 2000-180791 has a coercive force of 100 Oe (oersted) or more, but much stronger coercive force is demanded. This is because the stronger the coercive force, the higher-level property of the Faraday rotator is obtained in the hard magnetic bismuth-substituted rare earth iron garnet single crystal which features the ability to maintain the Faraday rotation angle even if the external magnetic field is removed.

In practical application of the Faraday rotator, the aforementioned Faraday rotary moment, temperature property, wavelength property, insertion loss and coercive force constitute important properties. Therefore, it is an object of the present invention to provide a hard magnetic bismuth-substituted rare earth iron garnet material with excellent Faraday rotary moment, temperature property and wavelength property, and insertion loss. It is another object of the present invention to provide a technology for stably manufacturing a high performance Faraday rotator with excellent coercive force, etc.

It is a further object of the present invention to provide an optical device such as optical isolator provided with a high performance Faraday rotator.

It is a still further object of the present invention to provide an optical communication system provided with such an optical device.

As described above, Faraday rotary moment, temperature property(temperature dependency), wavelength property (wavelength dependency), and insertion loss are important properties for practical application of a Faraday rotator.

Here, the Faraday rotation angle is proportional to the thickness of a material composing a Faraday rotator. A rotation angle per unit thickness is called "Faraday rotary moment". Since the rotation angle of the Faraday rotator used for the optical isolator is 45°, it is possible to reduce the thickness of the Faraday rotator as Faraday rotary moment increases, which is more advantageous for miniaturization.

The optical isolator, which is one of optical devices, is not always used at a constant temperature and requires an operation guarantee in a temperature range of, for example, −40° C. to +85° C. As the temperature dependency of the Faraday rotation angle becomes smaller, operation in a wider temperature range is possible. Therefore, the temperature dependency of the Faraday rotation angle, that is, temperature property is also an important property.

Wavelengths used for a current optical isolator are 1.31 μm (1310 nm) and 1.55 μm (1550 nm), but these are only central wavelengths. That is, there is a certain width in wavelengths of light actually emitted from an LD. Thus, the wavelength dependency of the Faraday rotation angle, that is, wavelength property is also a necessary property. Above all, it is an extremely important property when adopting a large volume transmission technology using wavelength multiplexing for optical communications.

Furthermore, attenuation of emitting light with respect to incident light is called "insertion loss". To secure high quality information transmission, the Faraday rotator is required to reduce insertion loss. Insertion loss of a Faraday rotator consists of light absorption loss of a material composing the Faraday rotator and reflection loss of an interface due to a difference in refractive index between the material and air. Reflection loss can be reduced to a negligible level by applying anti-reflective coating to the Faraday rotator surface. Thus, the insertion loss of the optical isolator is light absorption loss of the Faraday rotator. This light absorption loss is determined by light absorption of ions composing a bismuth-substituted rare earth iron garnet material.

The present inventors have examined how to realize hard magnetism with excellent Faraday rotary moment, temperature property, wavelength property and insertion loss. As a result, the present inventors have discovered that an unprecedentedly new chemical composition necessarily containing Gd, Tb and Yb at rare earth sites is effective for a bismuth-substituted rare earth iron garnet material. The present invention is based on this knowledge, provides a hard magnetic garnet material characterized by having a chemical composition of $(Bi_{3-a-b-c}Gd_aTb_bYb_c)Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$), and exhibiting rectangular magnetic hysteresis.

For the hard magnetic garnet material of the present invention, it is preferable to set $1.0 \leq a+b+c \leq 2.3$ and $0.3 \leq w \leq 2.0$, or further preferable to set $0.1 \leq a \leq 1.5$, $0.3 \leq b \leq 2.0$, $0.1 \leq c \leq 1.5$ and $0.4 \leq w \leq 1.5$.

The hard magnetic garnet material of the present invention allows Faraday rotary moment in a temperature range of −40° C. to +85° C. with a wavelength of 1550 nm to be set to 700°/cm or more. Furthermore, the hard magnetic garnet material of the present invention can reduce insertion loss at room temperature with a wavelength of 1550 nm to 0.1 dB or less. The hard magnetic garnet material of the present invention can further substantially maintain the aforementioned Faraday rotary moment even after an external magnetic field equal to or greater than saturation magnetization of the hard magnetic garnet material is applied and then the external magnetic field is removed. The hard magnetic garnet material of the present invention can set the temperature property of the Faraday rotation angle in a temperature range of −40° C. to +85° C. with a wavelength of 1550 nm to 13% or less of its target value. The hard magnetic garnet material of the present invention can further set the wavelength property of the Faraday rotation angle at room temperature with a wavelength of 1500 to 1600 nm to 8% or less of its target value.

The present invention provides the following Faraday rotator to which the above described hard magnetic garnet material is applied. That is, the Faraday rotator of the present invention is a Faraday rotator that uses a bismuth-substituted rare earth iron garnet single crystal and rotates the polarization plane of incident light, characterized in that the aforementioned single crystal always contains Gd, Tb and Yb as rate earth elements, exhibits substantially rectangular magnetic hysteresis, has Faraday rotary moment of 700°/cm or more in a temperature range of −40° C. to +85° C. with a wavelength of 1550 nm and has insertion loss of 0.1 dB or less at room temperature with a wavelength of 1550 nm. It is also characterized in that the temperature property of the Faraday rotation angle in a temperature range of −40° C. to +85° C. with a wavelength of 1550 nm is 13% or less of its target value and the wavelength property of the Faraday rotation angle at room temperature with a wavelength of 1500 nm to 1600 nm is 8% or less of its target value.

The single crystal of the Faraday rotator of the present invention can contain at least one element selected from the group consisting of La, Ce, Pr, Nd, Pm, Sm, Eu, Dy, Lu, Tm, Er, Ho, Y, and Ca.

The Faraday rotator of the present invention can set the Faraday rotary moment in a temperature range of −40° C. to +85° C. with a wavelength of 1550 nm to 800°/cm or more, temperature property thereof in a temperature range of −40° C. to +85° C. with a wavelength of 1550 nm to 11% or less of its target value, wavelength property thereof at room temperature with a wavelength of 1550 nm to 1600 nm to 7% or less of its target value, and insertion loss at room temperature and a wavelength of 1550 nm to 0.07 dB or less.

The present invention also provides the following optical device using the above described Faraday rotator. The optical device of the present invention is basically composed of a first optical element into which forward light enters, a second optical element placed opposite to the first optical element in a predetermined distance from which forward light is emitted and a Faraday rotator placed between the first optical element and second optical element, which rotates the polarization plane of light that has passed through the first optical element and emits the light toward the second optical element and blocks passage of backward light that has passed through the second optical element. The optical devices referred to here include a wide range of devices such as optical isolator, optical circulator, optical attenuator, magneto-optical field sensor and optical switch, etc. Furthermore, polarization separators such as polarizer, rutile can be used as the first optical element and second optical element. The optical device of the present invention is characterized in that it is constructed of a bismuth-substituted rare earth iron garnet single crystal having a chemical composition of $(Bi_{3-a-b-c}Gd_aTb_bYb_c) Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$), and characterized in that this bismuth-substituted rare earth iron garnet single crystal exhibits rectangular magnetic hysteresis.

Optical devices such as optical isolators are used for optical transmitters in an optical communication system as described above. The present invention also proposes that the optical device of the present invention should be applied to this optical communication system. This proposal is an optical communication system provided with an optical transmitter that issues an optical signal converted from an electric signal, an optical transmission line that transmits the optical signal issued form the optical transmitter and an optical receiver that receives the optical signal sent through the optical transmission line and converts the received optical signal to an electric signal, characterized in that the optical transmitter includes an electro-optic converter that converts the electric signal to the optical signal and an optical device placed between the electro-optic converter and the optical transmission line, a Faraday rotator composing the optical device is constructed of a bismuth-substituted rare earth iron garnet single crystal having a chemical composition of $(Bi_{3-a-b-c}Gd_aTb_bYb_c)Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$) and this bismuth-substituted rare earth iron garnet single crystal exhibits rectangular magnetic hysteresis.

In the optical communication system, for example, a light amplifier may be placed on the optical transmission line made of an optical fiber. An optical device such as an optical isolator may also be used for this light amplifier. The optical device of the present invention may also be used for this optical device. That is, for the optical communication system of the present invention, a light amplifier is placed on the optical transmission line, the light amplifier includes an optical device that receives the optical signal transmitted on the optical transmission line and rotates the polarization plane of the received optical signal and amplification means for amplifying the optical signal that has passed through the optical device, the Faraday rotator making up the optical device can be constructed of a bismuth-substituted rare earth iron garnet single crystal having a chemical composition of $(Bi_{3-a-b-c}Gd_aTb_bYb_c) Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$). Moreover, this bismuth-substituted rare earth iron garnet single crystal preferably exhibits rectangular magnetic hysteresis.

Furthermore, as shown above, a coercive force is an important property for practical application of the Faraday rotator using a hard magnetic garnet material. The present inventors have made various analyses to obtain a bismuth-substituted rare earth iron garnet material with hard magnetism and an excellent coercive force. As a result, the present inventors have discovered that the bismuth-substituted rare earth iron garnet material exhibits ideal rectangular magnetic hysteresis and at the same time improved coercive force by applying heat treatment while applying an external magnetic field (hereinafter referred to as "magnetic heat treatment" as appropriate). That is, the present invention is a method of manufacturing a Faraday rotator using a bismuth-substituted rare earth iron garnet single crystal exhibiting substantially rectangular magnetic hysteresis and is characterized by including a single crystal growing step of growing a single crystal and a magnetic heat treatment step of applying heat treatment while applying an external magnetic field to the single crystal. Here, as the chemical composition of the single crystal to be grown in the single crystal growing step, adopting the chemical composition recommended by the present invention, that is, $(Bi_{3-a-b-c}Gd_aTb_bYb_c) Fe_{(5-w)}M_wO_{12}$ (where, M is at least one element selected from the group consisting of Ga, Al, Ge., Sc, In, Si and Ti, $0.5 \leq a+b+c \leq 2.5$, $0.2 \leq w \leq 2.5$), makes it possible to obtain a Faraday rotator with a high coercive force with high performance also in aspects of Faraday rotary moment, temperature property, wavelength property and insertion loss. Furthermore, in the magnetic heat treatment step of the present invention, applying magnetic heat treatment at temperatures of 1100° C. or lower is effective in improving the coercive force. Furthermore, it is desirable to cool down the single crystal while applying an external magnetic field after maintaining the temperature range in the magnetic heat treatment step. Furthermore, it is preferable to set the external magnetic field in the magnetic heat treatment step to 300 Oe or more and it is preferable to adopt an irreducible atmosphere as the heat treatment atmosphere in the magnetic heat treatment step.

Furthermore, the present invention provides a Faraday rotator characterized in that it uses a bismuth-substituted rare earth iron garnet single crystal and rotates the polarization plane of incident light, the single crystal having a chemical composition of $(Bi_{3-a-b-c}Gd_aTb_bYb_c) Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$), and characterized by having a coercive force of 600 Oe or more at room temperature through magnetic heat treatment. This is based on the knowledge of the present inventors that the magnetic properties improve by constructing the bismuth-substituted rare earth iron garnet single crystal using Gd, Tb and Yb as essential elements.

The present invention further provides a method of manufacturing a bismuth-substituted rare earth iron garnet single crystal exhibiting substantially rectangular magnetic hysteresis characterized by including a step of growing a single crystal using a liquid phase epitaxial growth method and a step of making said single crystal a single magnetic domain while heating or cooling this single crystal. In the step of making said single crystal a single magnetic domain, it is effective to heat or cool down the single crystal to the temperatures of 1100° C. or lower while applying an external magnetic field of 300 Oe or more.

The present invention also provides the following optical device using a Faraday rotator. The optical device of the present invention uses, as basic components, a first optical element into which forward light enters, a second optical element placed opposite to the first optical element in a predetermined distance from which forward light is emitted and a Faraday rotator placed between the first optical element and second optical element, which rotates the polarization plane of light that has passed through the first optical element and emits the light toward the second optical element and blocks passage of backward light that has passed through the second optical element. For the optical device according to the present invention, it is possible to use a Faraday rotator constructed of a bismuth-substituted rare earth iron garnet single crystal, which is heated or cooled with an external magnetic field applied thereto in the direction in which the magnetic field is formed approximately parallel to forward light. This Faraday rotator exhibits rectangular magnetic hysteresis and has coercive force of 600 Oe or more at room temperature, and therefore the optical device according to the present invention, for example, optical isolator realizes high performance isolation.

On the other hand, the Faraday rotator is manufactured by polishing a bismuth-substituted rare earth iron garnet single crystal (hereinafter referred to as "garnet single crystal" as appropriate or simply as "single crystal") formed using an LPE method to a predetermined thickness and then cutting it. The present inventors have conducted various analyses from standpoints other than the chemical composition to obtain a high performance Faraday rotator and have discovered that properties of the cross section of the garnet single crystal affect the performance of the Faraday rotator. Here, properties of the section of the garnet single crystal include the presence/absence of chipping, etc. Chipping refers to a phenomenon that edges of the section of the garnet single crystal become chipped when the garnet single crystal is cut. Thus, to obtain a high performance Faraday rotator, not only properties of the material composing the Faraday rotator is important but also how to reduce chipping when cutting the garnet single crystal constitutes an important key.

This chipping is especially an important issue for a hard magnetic garnet single crystal. This is because chipping that occurs when the magnetic garnet single crystal is cut becomes a kind of crystalline defect, which reduces a coercive force significantly. Here, as described above, the coercive force is an important element for the hard magnetic garnet single crystal. Furthermore, the coercive force and chipping when the magnetic garnet single crystal is cut have a close relationship and suppressing chipping when cutting the garnet single crystal is extremely important in improving the coercive force.

The present inventors have tried various cutting methods to suppress chipping when cutting the garnet single crystal and has come to discover that cutting using a wire saw is very effective. That is, the present invention provides a method of manufacturing a Faraday rotator which uses a bismuth-substituted rare earth iron garnet single crystal and rotates the polarization plane of incident light, characterized by including a single crystal growing step of growing a single crystal and a cutting step of cutting the single crystal obtained in this single crystal growing step, using a wire saw. The Faraday rotator manufacturing method according to the present invention is effective not only for a hard magnetic material having the aforementioned chemical composition recommended by the present invention but also for hard magnetic materials having other chemical compositions. Furthermore, the cutting method using a wire saw according to the present invention is not limited to hard magnetic materials but is also applicable to conventional soft magnetic materials. Especially when the Faraday rotator adhered to other optical elements by means of resin, etc. is cut using a wire saw, it is possible to effectively suppress chipping or detachment of optical elements during cutting.

Furthermore, the present invention also provides a Faraday rotator using a bismuth-substituted rare earth iron garnet single crystal, which includes front and back surfaces placed opposite to each other in a predetermined distance and sides formed around these front and back surfaces, characterized in that fine projections and depressions are formed uniformly on at least one side of the sides. To form uniform fine projections and depressions on the sides of the bismuth-substituted rare earth iron garnet single crystal, for example, a wire saw can be used. In addition, at least one side of the sides in the single crystal has an isotropic pattern. For the Faraday rotator according to the present invention, it is effective to use a single crystal exhibiting substantially rectangular magnetic hysteresis.

Furthermore, the present invention also provides the following optical device using a Faraday rotator. The optical device of the present invention uses, as basic components, a first optical element into which forward light enters, a second optical element placed opposite to the first optical element in a predetermined distance from which forward light is emitted and a Faraday rotator placed between the first optical element and second optical element, which rotates the polarization plane of light that has passed through the first optical element and emits the light toward the second optical element and blocks passage of backward light that has passed through the second optical element. For the optical device according to the present invention, the single crystal is sandwiched between the first optical element and the second optical element with the first optical element and the second optical element are adhered to the single crystal using an adhesive such as resin. Furthermore, since the Faraday rotator of the optical device according to the present invention exhibits rectangular magnetic hysteresis and has a coercive force of 350 Oe or more at room temperature, the optical device of the present invention exhibits high performance.

BRIEF DESCRIPTION OF THE DRAWINGS

FIG. 8 illustrates an LPE method;

FIG. 9 is a table illustrating chemical composition, Faraday rotary moment, temperature property, wavelength property and insertion loss of samples No. 1 to 9;

FIG. 10 is a table illustrating chemical composition, Faraday rotary moment, temperature property, wavelength property and insertion loss of samples No. 1, 10 to 12;

FIG. 11 is a table illustrating chemical composition, Faraday rotary moment, temperature property, wavelength property and insertion loss of samples No. 13 to 21;

DETAILED DESCRIPTION OF THE PREFERRED EMBODIMENTS

With reference to the attached drawings, the present invention will be explained in more detail and more specifically below.

Figure 1:
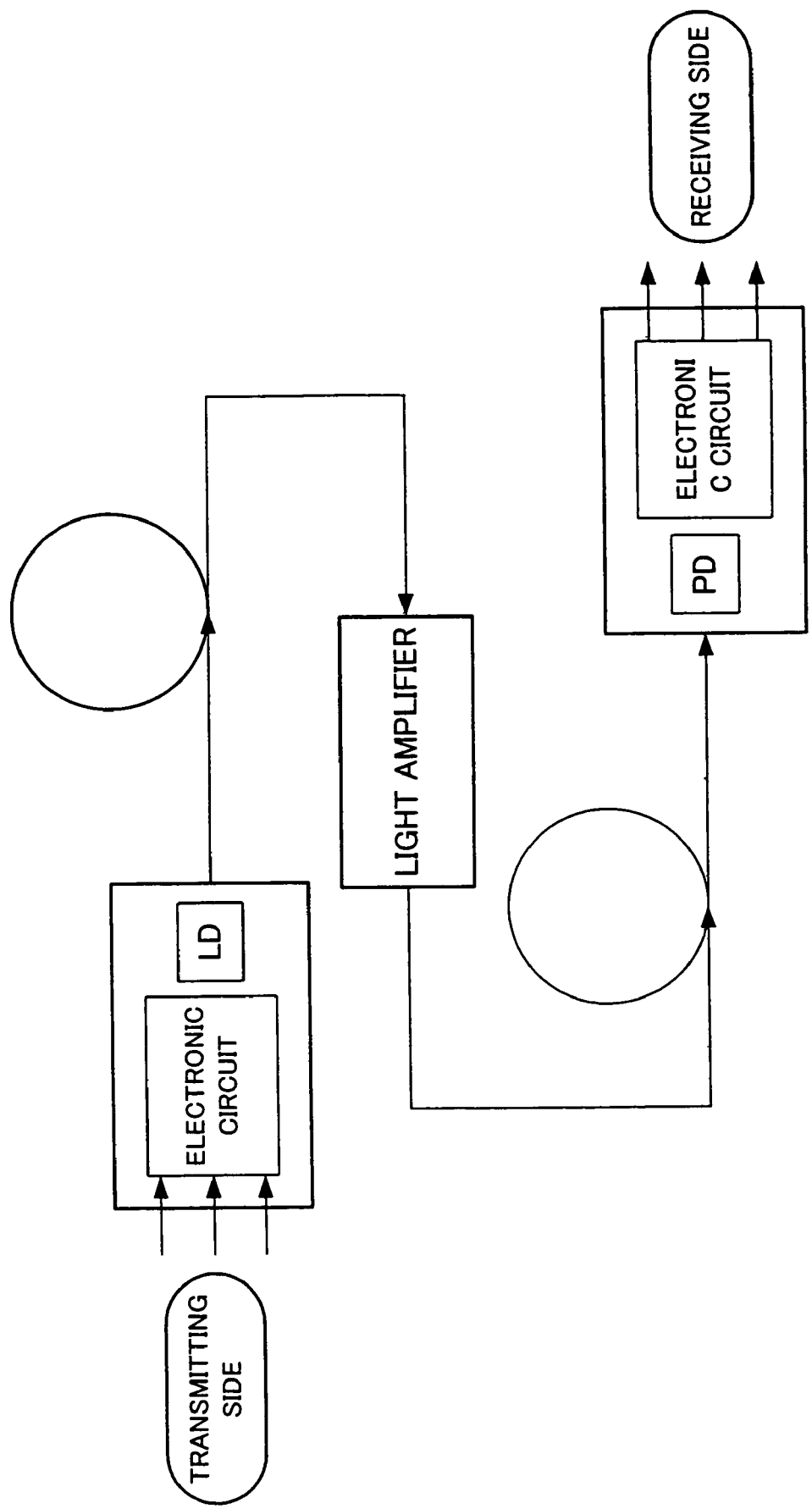
FIG. 1 illustrates a configuration of an optical communication system according to an embodiment.

First, an optical communication system 1 to which the present invention is applied will be explained using FIG. 1.

The optical communication system 1 is a system for transmitting information between the transmitting side and receiving side using an optical signal. An optical transmitter 2 is provided on the transmitting side, while an optical receiver 3 is provided on the receiving side. The optical transmitter 2 and optical receiver 3 are connected using an optical transmission line 4 made of an optical fiber. Light amplifiers 5 are inserted in the optical transmission line 4. There are a number of light amplifiers 5 according to the length of the optical transmission line 4.

The optical transmitter 2 is provided with an electronic circuit 21 and an LD module 22. Upon receipt of data to be transmitted as an electric signal, the electronic circuit 21 applies predetermined processing thereto and outputs to the LD module 22. The LD module 22 converts the received electric signal to an optical signal and then transmits it onto the optical transmission line 4.

The optical receiver 3 is provided with a PD module 31 and an electronic circuit 32. Upon receipt of the optical signal sent through the optical transmission line 4, the PD module 31 converts the optical signal to an electric signal and outputs to the electronic circuit 32. The electronic circuit 32 outputs the received electric signal to the receiving side.

The light amplifiers 5 placed on the optical transmission line 4 amplify optical signals transmitted through the optical transmission line 4 to prevent their attenuation.

Figure 2:
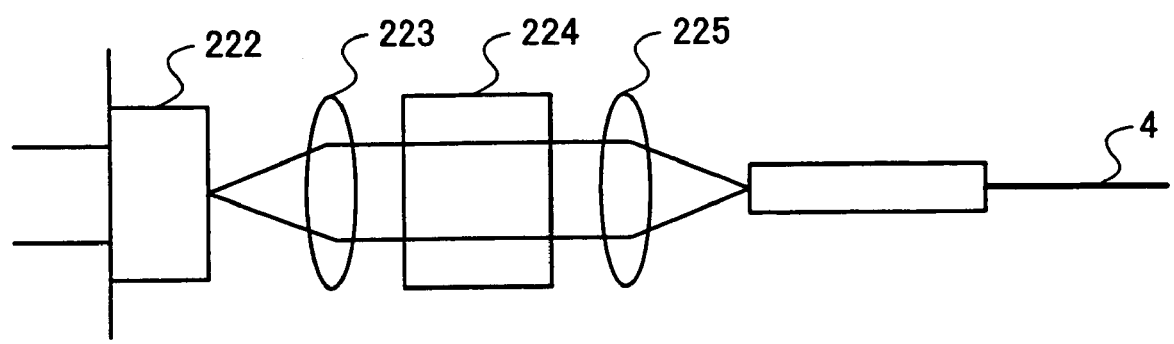
FIG. 2 is a perspective view showing a configuration of an LD module according to this embodiment.

FIG. 2 shows a configuration of the LD module 22. The LD module 22 is provided with an LD 222 placed inside a case, a lens 223 through which light (signal) output from the LD 222 passes and an optical isolator (optical device) 224 that rotates the polarization plane of the light (signal) that has passed through the lens 223. The light (signal) passed through the optical isolator 224 enters into a lens 225. The light (signal) is emitted from the lens 225 toward the optical transmission line 4.

FIG. 3 shows a configuration of the optical isolator 224. As shown in FIG. 3, the optical isolator 224 has a configuration with a Faraday rotator 224b inserted between two polarizers (first optical element, second optical element) 224a and 224c. The two polarizers 224a and 224c are placed opposite to each other in a predetermined distance. Now, suppose light in the forward direction (forward light) enters into the polarizer 224a. The forward light is emitted from the polarizer 224c toward the optical transmission line 4.

It is possible to use a known material for the polarizers 224a and 224c. For example, Pola Core (product name) manufactured of Coning Inc. is preferable, but the polarizers are not limited to this.

The Faraday rotator 224b rotates the polarization plane of light that has passed through the polarizer 224a and emits it toward the polarizer 224c. The Faraday rotator 224b blocks passage of backward light (light in the backward direction) from the polarizer 224c. The reason that this backward light can be blocked has already been described and explanations thereof will be omitted here.

According to the present invention, this Faraday rotator 224b is constructed of a Bi-substituted rare earth iron garnet single crystal exhibiting rectangular magnetic hysteresis.

The chemical composition of the Bi-substituted rare earth iron garnet single crystal is preferably $(Bi_{3-x}R_x)Fe_{(5-w)}M_wO_{12}$ (where, R is at least one element selected from the group consisting of rare earth elements and Y, M is at least one element selected from the group consisting of Ga, Al, Ge, Sc, In, Si and Ti). Here, R is at least one element selected from the group consisting of rare earth elements (La, Ce, Pr, Nd, Pm, Sm, Eu, Gd, Tb, Dy, Ho, Er, Tm, Yb and Lu) and Y. Hereafter rare earth elements including Y will be called "rare earth element R".

Furthermore, for the hard magnetic garnet material of the present invention, it is preferable to set $0.5 \leq x \leq 2.5$ and $0.2 \leq w \leq 2.5$ and it is more preferable to set $1.0 \leq x \leq 2.3$ and $0.4 \leq w \leq 1.5$.

Gd, Tb and Yb are especially preferable as rare earth element R and it is preferable to ensure that three elements of Gd, Tb and Yb are included as rare earth element R.

Since Gd has the largest magnetic moment among rare earth elements, Gd is effective for reducing saturation magnetization (4πMs). Furthermore, since GdBi-based garnet has a magnetization inversion temperature of about −10° C., which is closer to room temperature than −50° C. of TbBi-based garnet, it is advantageous to hard magnetism. Furthermore, Gd has no absorption of light whose wavelength is equal to or greater than 1.2 μm, it is advantageous to insertion loss.

Tb is an element effective in securing a temperature property and wavelength property. Gd has large magnetic anisotropy and is an element effective in increasing coercive force, but Tb has greater contribution to coercive force.

The Bi-substituted rare earth iron garnet single crystal of the present invention is assumed to be formed according to an LPE method, but Yb is included so that the lattice constant of the single crystal matches the lattice constant of the substrate. To increase Faraday rotary moment, it is preferable to make a crystal containing a large portion of Bi. Here, the Faraday rotation angle is proportional to the thickness of the material composing the Faraday rotator 224b and the rotation angle per unit thickness is called "Faraday rotary moment". Furthermore, since the rotation angle of the Faraday rotator 224b used for the optical isolator 224 is 45°, the greater the Faraday rotary moment, the thinner the Faraday rotator 224b can be made, which is advantageous for miniaturization.

Furthermore, the substrate used for the LPE method (hereinafter referred to as a "LPE substrate") has a predetermined lattice constant. Since Bi has a large ion radius, simply increasing the amount of Bi makes it impossible to match the lattice constant of the single crystal to be obtained to the lattice constant of the substrate. Thus, the lattice constant of the single crystal to be obtained is matched to that of the substrate by containing Yb whose ion radius is small while increasing the amount of Bi. Moreover, since Yb has no light absorption in the wavelength area of light used for optical communications, Yb does not reduce insertion loss.

For the above described reasons, it is especially preferable that the composition of the Bi-substituted rare earth iron garnet single crystal of the present invention be $(Bi_{3-a-b-c}Gd_aTb_bYb_c)Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$).

By the way, with respect to the Bi-substituted rare earth iron garnet material of the present invention, M is an element substituting part of Fe and, M is at least one element selected from the group consisting of Ga, Al, Ge, Sc, In, Si and Ti. Among them, Ga is the most preferable element from the standpoint of ease of growth of the single crystal.

In the Bi-substituted rare earth iron garnet material of the present invention, a, b and c which indicate the amounts of Gd, Tb and Yb are set to $0.5 \leq a+b+c \leq 2.5$. When (a+b+c) is less than 0.5, the amount of Bi having a large ion radius becomes relatively large, making it impossible to realize matching with the lattice constant of the LPE substrate to grow the single crystal according to the LPE method. On the other hand, when (a+b+c) exceeds 2.5, the amount of Bi becomes relatively smaller by contrast and the Faraday rotary moment becomes smaller. Consequently, the thickness of the single crystal must be increased, which makes it difficult to grow the single crystal according to the LPE method and leads to a reduction of yield. A preferable range of (a+b+c) is $1.0 \leq a+b+c \geq 2.3$.

Furthermore, it is preferable to set each of "a", "b" and "c" to $0.1 \leq a \leq 1.5$, $0.3 \leq b \leq 2.0$, and $0.1 \leq c \leq 1.5$. "a" (amount of Gd) is set to 0.1 or greater so as to secure sufficient magnetic anisotropy to obtain hard magnetism. On the other hand, when "a" exceeds 1.5, there will be shortages of Tb and Bi, making it impossible to obtain high Faraday rotary moment.

"b" (amount of Tb) is set to 0.3 or greater so as to secure sufficient magnetic anisotropy to obtain hard magnetism. On the other hand, when "b" exceeds 1.5, there will be large insertion loss for light having a wavelength greater than 1.5 μm (1500 nm).

"c" (amount of Yb) is set to 0.1 or greater because if "c" is smaller than 0.1, it is impossible to secure sufficient Faraday rotary moment and the thickness of the crystal must be increased. On the other hand, when "c" exceeds 1.5, there will be shortages of Gd, Tb and Bi, which makes it impossible to secure high Faraday rotary moment.

For the Bi-substituted rare earth iron garnet material of the present invention, "w" representing the substitution amount of with respect to Fe is set to $0.2 \leq w \leq 2.5$. If "w" is smaller than 0.2, the single crystal obtained cannot maintain rectangular magnetic hysteresis. On the other hand, if "w" exceeds 2.5, unnecessary crystal nucleus is formed in the melted part during the growth of the single crystal, making sound growth of the single crystal difficult. A preferable range of "w" is $0.3 \leq w \leq 2.0$, and more preferably $0.4 \leq w \leq 1.5$.

As described above, by adjusting the chemical composition of the single crystal having a chemical composition of $(Bi_{3-x}R_x)Fe_{(5-w)}M_wO_{12}$ (where, R is at least one element selected from the group consisting of rare earth elements and Y, M is at least one element selected from the group consisting of Ga, Al, Ge, Sc, In, Si and Ti) as appropriate, it is possible to embody a Faraday effect in a temperature range of −40° C. to +85° C., that is, the temperature range in which the operation of the optical isolator needs to be guaranteed and obtain a Bi-substituted rare earth iron garnet material having Faraday rotary moment of 700°/cm or more in a temperature range of −40° C. to +85° C. and a wavelength of 1550 nm. This garnet material substantially maintains the above described Faraday rotary moment even after an external magnetic field equal to or greater than the saturation magnetism exhibited by this material is applied and then the external magnetic field is removed.

Furthermore, when the chemical composition of the single crystal is adjusted so that three elements of Gd, Tb and Yb are used as essential elements as rare earth element R, it is possible to embody a Faraday effect in a temperature range of −40° C. to +85° C., that is, the temperature range in which the operation of the optical isolator needs to be guaranteed and obtain a Bi-substituted rare earth iron garnet material having Faraday rotary moment of 700°/cm or more in a temperature range of −40° C. to +85° C. with a wavelength of 1550 nm.

Furthermore, the garnet material according to the present invention using three elements of Gd, Tb and Yb as essential elements can obtain Faraday rotary moment of 1000°/cm or more in a temperature range of −40° C. to +85° C. with a wavelength of 1310 nm.

Furthermore, the garnet material according to the present invention allows the temperature property of the Faraday rotation angle in a temperature range of −40° C. to +85° C. and a wavelength of 1550 nm to be set to 13% or less of its target value. Furthermore, this material allows the temperature property of the Faraday rotation angle in a temperature range of −40° C. to +85° C. with a wavelength of 1310 nm to be set to 10% or less of its target value. By the way, the temperature property may be a negative value, but the temperature property specified in the present invention is an absolute value. The same applies to the wavelength property. Furthermore, the "target value" according to the present invention has the following meaning. That is, the rotation angle of the current optical isolator is set to 45° as described above. This 45° is the target value described in the present invention. In the case of the current optical isolator, the temperature property is calculated using this 45° as a reference. For example, when the rotation angle is set to 60°, the temperature property is calculated using this 60° as a reference. The same applies to the wavelength property, too.

Furthermore, the garnet material of the present invention allows the wavelength property of the Faraday rotation angle at room temperature and a wavelength of 1500 to 1600 nm to be set to 8% or less of its target value and allows the wavelength property at room temperature and a wavelength of 1250 to 1360 nm to be set to 13% or less of its target value.

When importance is attached to the temperature property and wavelength property of the garnet material of the present invention, the amount of Tb can be increased. On the other hand, when importance is attached to insertion loss, the amount of Gd can be increased. Furthermore, when Faraday rotary moment is increased and importance is attached to miniaturization, the amount of Bi can be increased.

The Faraday rotator according to the present invention can be constructed of a single crystal grown from the above described Bi-substituted rare earth iron garnet material using the LPE method. This single crystal always contains Gd, Tb and Yb as rare earth elements, exhibits substantially rectangular magnetic hysteresis, has Faraday rotary moment of 700°/cm or more in a temperature range of −40° C. to +85° C. with a wavelength of 1550 nm and insertion loss of 0.1 dB or less at room temperature with a wavelength of 1550 nm. It also has a temperature property of the Faraday rotation angle of 13% or less of its target value in a temperature range of −40° C. to +85° C. with a wavelength of 1550 nm and a wavelength property of the Faraday rotation angle of 8% or less of its target value at room temperature with a wavelength of 1500 to 1600 nm.

The single crystal according to the present invention has Gd, Tb and Yb as essential components as rare earth elements, but this does not exclude inclusion of other rare earth elements. Therefore, inclusion of one or more kinds of La, Ce, Pr, Nd, Pm, Sm, Eu, Dy, Ho, Er, Tm, Lu, and Y in addition to Gd, Tb and Yb also falls within the scope of the present invention. Furthermore, inclusion of Ca in addition to the above described rare earth elements also falls within the scope of the present invention. However, the inclusion thereof should be suppressed to a level that would not harm the effects of the present invention. Anyway, it is not easy to determine their specific contents.

The single crystal according to the present invention is characterized by using Gd, Tb and Yb as essential components as rare earth elements. Of these three rare earth elements, Gd and Tb are included for the purpose of improving the temperature property and wavelength property of the Faraday rotary moment. On the other hand, Yb is included for the purpose of matching of lattice constant with that of the LPE substrate. Of the above described rare earth elements whose inclusion cannot be excluded in the present invention, Sm, Eu and Dy have large magnetic anisotropy as in the case of Gd and Tb. Furthermore, Lu, Tm, Er, Ho and Y are common to Yb in that they have a smaller ion radius than Dy.

Next, the method of manufacturing a Faraday rotator through the single crystal growth process, magnetization process, cutting process and magnetic heat treatment will be explained.

<Single Crystal Growth Process>

The single crystal according to the present invention can be grown using an LPE method. FIG. 8 shows how a single crystal is grown using the LPE method.

As shown in FIG. 8, a raw material of a single crystal to be created and flux are deposited into, for example, a platinum crucible 40. By energizing a heating coil 41, the raw material and flux deposited into the crucible 40 are heated and melted into melt 42. When the melt 42 is cooled down to a super cooled state, the LPE substrate 43 is turned and contacted to the melt 42, then a single crystal 44 epitaxial-grows on the LPE substrate 43. Here, impurities from the flux and crucible 40 are unavoidably mixed into the grown single crystal 44, but it goes without saying that the present invention tolerates this unavoidable mixing of impurities. Of course, it is desirable to reduce the mixing of these impurities to prove the effectiveness of the present invention.

The single crystal 44 obtained through the LPE method is grown a little thicker than the Faraday rotator 224b to be obtained finally. This is because after subjected to polishing, the single crystal 44 is to be used as the Faraday rotator 224b. By the way, as the Faraday rotator 224b, the single crystal 44 is used whose rotation angle with respect to the wavelength of the light used becomes 45°. In other words, the single crystal 44 obtained using the LPE method is polished until its Faraday rotation angle becomes 45°. The Faraday rotator 224b has a thickness of approximately 500 µm. It is preferable to apply anti-reflective coating to the surface of the polished Faraday rotator 224b to reduce insertion loss.

<Magnetization Process>

In the magnetization process, an external magnetic field is applied to the Faraday rotator 224b constructed of the single crystal 44.

Figure 3A:
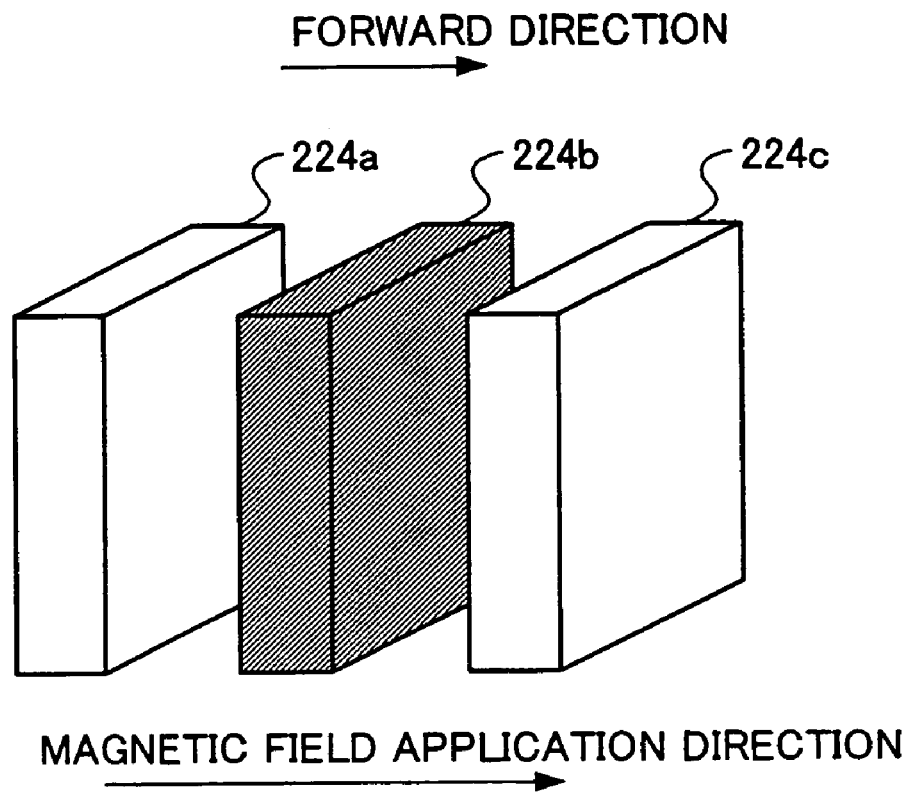
FIG. 3 illustrates a configuration of an optical isolator according to this embodiment.

The intensity of the external magnetic field is equal to or greater than that of saturated magnetic field, and more specifically 300 Oe or more. The higher the intensity of the external magnetic field, the stronger coercive force of the Faraday rotator 224b can be expected. However, to prevent any cost increase of the apparatus, the upper limit of intensity of the current external magnetic field is set to approximately 20 kOe. Preferable intensity of the external magnetic field is 500 Oe or more and more preferable intensity of the external magnetic field is 1 kOe or more. To apply the magnetic field equal to or greater than saturated magnetic field to the Faraday rotator 224b, an electro magnet, etc. can be used. The magnetic field application direction is the direction in which the Faraday rotator 224b is finally to be magnetized and more specifically the magnetic field is applied in the thickness direction of the Faraday rotator 224b. Here, using FIG. 3A, the magnetic field application direction with respect to the Faraday rotator 224b will be shown. As shown in FIG. 3A, the Faraday rotator 224b is placed between the polarizers 224a and 224c. A magnetic field is applied in the thickness direction of the Faraday rotator 224b in such a way that the magnetic field is approximately parallel to the direction in which light propagates, that is, forward light.

The time for applying the magnetic field may be about 1 minute to 1 hour. However, this time depends on the intensity of the external magnetic field and when the external magnetic field is strong, or more specifically when the intensity of the external magnetic field is 500 Oe or more, even a few seconds of application of the external magnetic field allows the above described effect of increasing coercive force to be attained.

By the way, this magnetization process is applied to the hard magnetic material. Furthermore, this magnetization process need not necessarily be applied before the cutting process, but can also be applied after the cutting process. However, magnetizing the single crystal before the cutting process has an advantage of magnetizing the single crystal by one operation.

<Cutting Process>

In this cutting process, the single crystal 44 is cut using a wire saw. As the wire saw, a diamond wire saw can be used, for example. The diamond wire saw, wherein metal bond beads mixed with diamond abrasive grains are arranged along and bonded to a dedicated wire, is a diamond tool used in a wire sawing technique. The wire saw is not limited to this diamond wire saw, but a cutting tool using a piano wire and abrasive grains such as alumina is also called a "wire saw" according to this embodiment.

The reason why cutting using the wire saw is effective will be explained first and then cutting conditions using the wire saw will be described below.

In the case of a hard magnetic material, the reason why cutting using the wire saw is effective is as follows. That is, as described above, if chipping occurs with a hard magnetic material, magnetic properties deteriorate significantly. Thus, the reason why the magnetic properties deteriorate due to chipping is based on a coercive force generation mechanism of a hard magnetic material as will be explained below.

The coercive force generation mechanism of a hard magnetic Bi-substituted rare earth iron garnet material is of a so-called nucleation type and a material of this type is characterized in that it is easily magnetized and once magnetized, reverse magnetic domains hardly occur. This feature allows the Faraday rotator 224b made of the single crystal 44 to exhibit rectangular magnetic hysteresis.

However, the actual problem in developing the single crystal 44 is that growth of a perfect crystal with no defects is extremely difficult. Thus, there are normally crystalline defects in the single crystal 44 and these crystalline defects become a nucleus for generation of reverse magnetic domains. Here, if chipping occurs when the single crystal 44 is cut, the chipped areas constitute crystalline defects, which then become a nucleus for generation of reverse magnetic domains. Thus, even if it is possible to grow a crystal as close as possible to a perfect crystal in the above-described single crystal growth process, if chipping occurs during cutting, the magnetic properties of a hard magnetic material deteriorate significantly.

Therefore, to obtain the single crystal 44 with high magnetic properties and Faraday rotator 224b with a high-level property, it is an extremely important issue how to suppress chipping during cutting of the single crystal 44.

When the single crystal 44 is cut using a wire saw, the contact between the single crystal 44 and wire is not planar contact but line contact. Therefore, compared to a case of cutting with planar contact as in the case of a dicing machine, cutting with a wire saw can significantly reduce load on the single crystal 44 to be cut and reduce chipping during cutting to a minimum. Thus, suppressing chipping makes it possible to maintain the single crystal close to a perfect crystal grown in the single crystal growth process and obtain the single crystal 44 with excellent magnetic properties.

On the other hand, if optical elements such as the polarizers 224a and 224c are bonded to the front and back surfaces of the single crystal 44 using resin, etc., and the single crystal 44 in this condition is cut using a dicing machine, notable chipping may occur or the optical elements adhered to the single crystal 44 may peel off the adhered layer such as resin. Or a problem like the optical elements coming off the dicing sheet may occur. This may be attributable to the fact that the cutting thickness increases too much compared to the cutting area of the single crystal 44 united with the optical element by adhering with resin, etc., that is, the cutting target and the load on the cutting target by cutting with planar contact using the dicing machine increases. On the other hand, in the case of cutting with line contact using a wire saw, even if the thickness of the cutting target is large, it is possible to minimize load on the cutting target and effectively suppress chipping during the cutting as a result.

Then, desirable cutting conditions using a wire saw will be explained.

It is preferable to use an ultra-fine wire for the wire saw. This is to further reduce the load on the single crystal 44. On the other hand, when cutting the single crystal 44, the wire needs to have predetermined strength. Therefore, a wire diameter is preferably 0.08 to 0.3 mm and more preferably 0.15 to 0.2 mm.

As will be described in embodiments that follow, when the single crystal 44 is cut using a wire saw, fine projections and depressions are formed uniformly on the section. Here, the smaller the mean size of abrasive grains used for the wire saw, the finer the projections and depressions formed on the section of the single crystal 44 become. Thus, the mean size of abrasive grains used for the wire saw is set to approximately 1 to 30 μm. A more preferable mean size of abrasive grains is 5 to 15 μm.

Suppose the wire saw makes a reciprocating movement (reciprocal running) and its running speed is 100 to 700 m/min. A more preferable running speed is 300 to 500 m/min. By the way, it is effective to use a so-called multi-wire saw to improve the cutting efficiency.

<Magnetic Heat Treatment Process>

Another feature of the present invention is that after the Faraday rotator 224b is cut, it is subjected to heat treatment while applying an external magnetic field thereto. This magnetic heat treatment process allows the magnetic hysteresis to describe an ideal rectangle and improves coercive force significantly.

The following explanation will describe the reason why applying a magnetic heat treatment process to the Faraday rotator 224b made of the single crystal 44 is effective in improving rectangularity of magnetic hysteresis and improving coercive force.

The coercive force generation mechanism of the hard magnetic Bi-substituted rare earth iron garnet material is of a so-called nucleation type. This type of material is easily magnetized and once magnetized, reverse magnetic domains hardly occur. Moreover, as described above, when growing the single crystal 44, it is difficult to grow perfect crystals free of defects. Thus, crystalline defects usually exist in the single crystal 44 and these crystalline defects become a nucleus of reverse magnetic domains. Simply applying heat treatment (heating only) to the Faraday rotator 224b made of the single crystal 44 with reverse magnetic domains cannot modify inclination of the magnetic domains. Unless the inclination of the magnetic domains is modified, not only the enhancement of coercive force is insufficient but also coercive force varies from one material to another, thus producing a reduction of yield.

On the other hand, as the present invention proposes, applying magnetic heat treatment concurrently with an external magnetic field to the Faraday rotator 224b made of the single crystal 44 makes it possible to modify the inclination of magnetic-domains and form magnetic hysteresis of ideal rectangularity. This is possibly attributable to the fact that magnetic domains pinned on defects, etc. in the single crystal 44 are released from their pinning sites when the external magnetic field is applied at temperatures of 1100° C. or lower, that is, in a state wherein atoms can move easily. Preferable temperature range is from room temperature to 1100° C., more preferably, 200 to 1100° C. Applying magnetic heat treatment causes magnetic domains to align ideally uniformly in the magnetic field direction, which prevents generation of reverse magnetic domains and improves coercive force as a consequence. Also, the magnetic heat treatment makes the single crystal 44 a single magnetic domain.

Then, preferable conditions in applying magnetic heat treatment to the Faraday rotator 224b will be explained.

The temperature for magnetic heat treatment is preferably set to 200 to 1100° C. When the temperature for magnetic heat treatment is lower than 200° C., distortion cannot be fully released and rotation of magnetic domains also becomes insufficient. On the other hand, when the magnetic heat treatment temperature exceeds 1100° C., evaporation of component elements such as Bi, which is a volatile component becomes conspicuous. When evaporation of these volatile components becomes conspicuous, the deterioration of rectangularity of magnetic hysteresis advances. This deteriorates magnetic anisotropy of the single crystal 44 of hard magnetism and also deteriorates coercive force. More specifically, the property of the Faraday rotator 224b deteriorates to an extent that the single crystal 44 of hard magnetism characterized by maintaining the Faraday rotation angle even if an external magnetic field is removed can no longer maintain the Faraday rotation angle without applying the external magnetic field.

Therefore, the magnetic heat treatment temperature is set to 200 to 1100° C. A more preferable magnetic heat treatment temperature is 400 to 1000° C. and a still more preferable magnetic heat treatment temperature is 500 to 800° C.

By the way, as in the case of the above-described magnetization process, the intensity of the external magnetic field is set to a value equal to or greater than a saturated magnetic field, or more specifically 300 Oe or more. Preferable intensity of the external magnetic field and the direction of the magnetic field applied are also the same as those in the above-described magnetization process, and therefore these explanations will be omitted.

The duration of magnetic heat treatment applied may be set to about 10 minutes to 8 hours. However, this duration varies depending on the intensity of the external magnetic field and when the external magnetic field has high intensity, or more particularly when the intensity of the external magnetic field is 500 Oe or more, it is possible to attain the above described high coercive force even if magnetic heat treatment is applied for only a few seconds to a few minutes.

The magnetic heat treatment atmosphere is set to an irreducible atmosphere, for example, an air or an atmosphere having an oxygen content of 10% or more.

Conducting magnetic heat treatment under the above described conditions can produce effects such as enhancement of coercive force, reduction of individual dispersions and improvement of yield, etc. In the cooling process after heating under the above described conditions, it is also desirable to cool the single crystal 44 while applying an external magnetic field thereto. The intensity of the external magnetic field in this case is the same as that in the magnetization process and magnetic heat treatment step. Furthermore, it is desirable to apply the external magnetic field until temperature reaches room temperature.

As described above, one of the features of the method of manufacturing the Faraday rotator according to the present invention is to apply magnetic heat treatment to a hard magnetic Bi-substituted rare earth iron garnet single crystal. Thus, the chemical composition of this single crystal is not limited to that having Gd, Tb and Yb as essential component elements. However, as recommended by the present invention, adopting, as the chemical composition of the single crystal, a chemical composition of $(Bi_{3-a-b-c}Gd_aTb_bYb_c)Fe_{(5-w)}M_wO_{12}$ (where, M is at least one element selected from the group consisting of Ga, Al, Ge, Sc, In, Si and Ti, $0.5 \leq a+b+c \leq 2.5$, $0.2 \leq w \leq 2.5$) makes it possible to obtain a Faraday rotator with excellent Faraday rotary moment, temperature property, wave property and insertion loss.

Another feature of the method of manufacturing the Faraday rotator according to the present invention is to cut the single crystal 44 using a wire saw. This feature makes it possible to effectively prevent chipping when cutting the single crystal 44, obtain the single crystal 44 and Faraday rotator 224b with excellent coercive force.

The above embodiment has described the case where the single crystal 44 is cut and then subjected to magnetic heat treatment, but timing of the magnetic heat treatment is not limited to this. Thus, the magnetic heat treatment process can also be conducted before the cutting process. Conducting magnetic heat treatment of the single crystal 44 before the cutting process has an advantage of being able to conduct magnetic heat treatment by one operation. By the way, when conducting magnetic heat treatment, magnetization is possible in this process and therefore the above magnetization process can be omitted.

Furthermore, the above embodiment has described the case where the single crystal 44 is a hard magnetic material, but cutting by a wire saw is also effective when the single crystal 44 is a soft magnetic material. The reasons will be explained below.

Since a soft magnetic material has a coercive force generation mechanism different from that of the above-described hard magnetic material, even if chipping occurs when the single crystal 44 is cut, as long as the chipping is within an allowable range (currently 100 μm or below), there is no such problem that the magnetic properties deteriorate significantly.

However, in the case of cutting by planar contact as in the case of a dicing machine, an increase in the quantity of chipping that occurs when the single crystal 44 is cut causes a reduction of yield. On the contrary, in the case of cutting the single crystal 44 using a wire saw, the contact between the single crystal 44 and the wire is line contact as described above. This reduces the load on the single crystal 44 which is the cutting target and minimizes the chipping during cutting.

The method of manufacturing the Faraday rotator through the single crystal growth process, magnetization process, cutting process and magnetic heat treatment process has been explained so far. Here, the method of manufacturing the Faraday rotator according to the present invention is characterized by its cutting process and magnetic heat treatment process and the present invention includes the following modes:

(A) Single crystal growth process→magnetization process→cutting process→magnetic heat treatment process (in case of hard magnetic material)
(B) Single crystal growth process→cutting process→magnetic heat treatment process (in case of hard magnetic material)
(C) Single crystal growth process→cutting process (in case of hard magnetic material, soft magnetic material)
(D) Single crystal growth process→magnetization process→cutting process (in case of hard magnetic material)
(E) Single crystal growth process→magnetic heat treatment process (in case of hard magnetic material)
(F) Single crystal growth process→magnetic heat treatment process→cutting process (in case of hard magnetic material)

If an ideal single crystal 44 close to a perfect crystal is obtained in the single crystal growth process, the magnetic heat treatment process can be omitted as appropriate. Since the ideal single crystal 44 has a high level property from the beginning, the improvement rate of coercive force by applying magnetic heat treatment is not so high, yet when the ideal single crystal 44 is subjected to a magnetic heat treatment process, it is expected to improve coercive force by about 20%. On the other hand, if the ideal single crystal 44 cannot be obtained in the single crystal growth process, the effect of improvement of the coercive force in the magnetic heat treatment process is outstanding. More specifically, it is also possible to improve the coercive force of the single crystal 44 about 1.5 to 5.0 times immediately after growth. However, it is actually very difficult to obtain an ideal single crystal 44 close to a perfect crystal and there can be heat distortion due to a temperature gradient during growth or cooling or crystalline defects caused by impurities, and therefore it is preferable to apply magnetic heat treatment after single crystal growth.

Even if an ideal single crystal 44 can be obtained, its property may deteriorate due to cutting distortion during machining. Therefore, it is preferable to conduct the magnetic heat treatment process after the cutting process to finally obtain the Faraday rotator 224b with a high-level characteristic.

EMBODIMENTS

Specific embodiments of the present invention will be explained below.

Embodiment 1

Eight kinds of Bi-substituted rare earth iron garnet single crystals were grown through epitaxial growth using bismuth oxide ($Bi_2O_3$, 4N), ferric oxide ($Fe_2O_3$, 4N); gadolinium oxide ($Gd_2O_3$, 5N), terbium oxide ($Tb_4O_7$, 3N), ytterbium oxide ($Yb_2O_3$, 4N) and gallium oxide ($Ga_2O_3$, 4N) as raw materials and using the apparatus shown in FIG. 8. The LPE substrate used is a (111) garnet single crystal (($GdCa)_3$ $(GaMgZr)_5O_{12}$). The lattice constant of this substrate is 1.2497±0.0002 nm. In addition to the above-described raw materials, lead oxide (PbO, 4N) and boric oxide ($B_2O_3$, 5N) were deposited into the platinum crucible 40 as flux.

Figure 4:
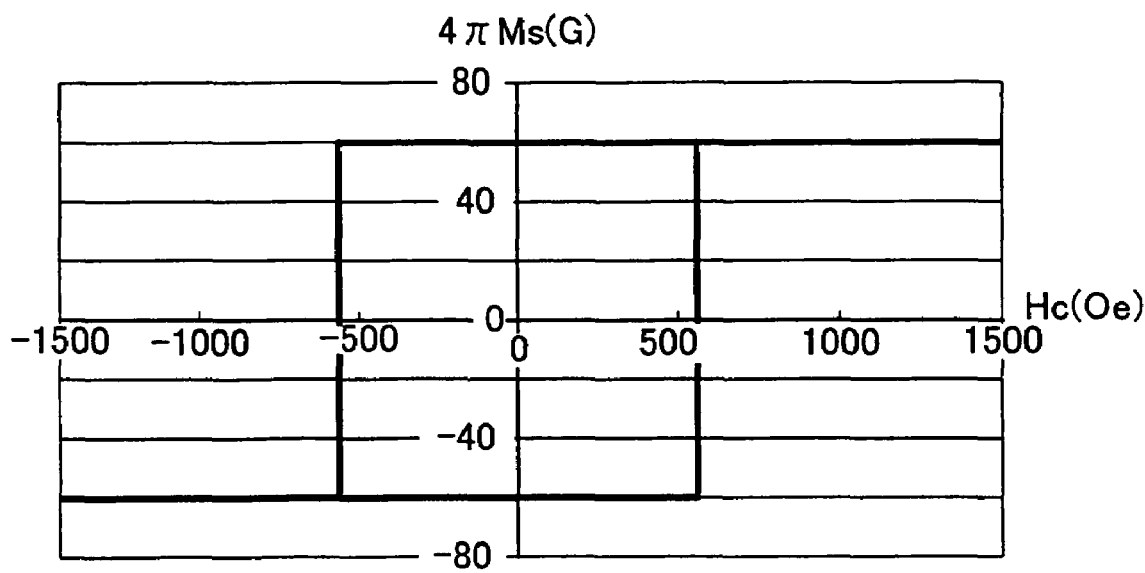
FIG. 4 illustrates a relationship between a coercive force and magnetization of a magnetic garnet material manufactured in Embodiment 1.

A composition analysis was conducted on the single crystal obtained. The result is shown in FIG. 9. Furthermore, after polishing this single crystal to 500 μm, its magnetic properties were measured using a VSM (vibration sample magnetometer). As a result, the single crystal of sample No. 1 exhibited saturation magnetization (4πMs) of 60 G, coercive force of 600 Oe with exhibiting excellent rectangular hysteresis as shown in FIG. 4.

Figure 5:
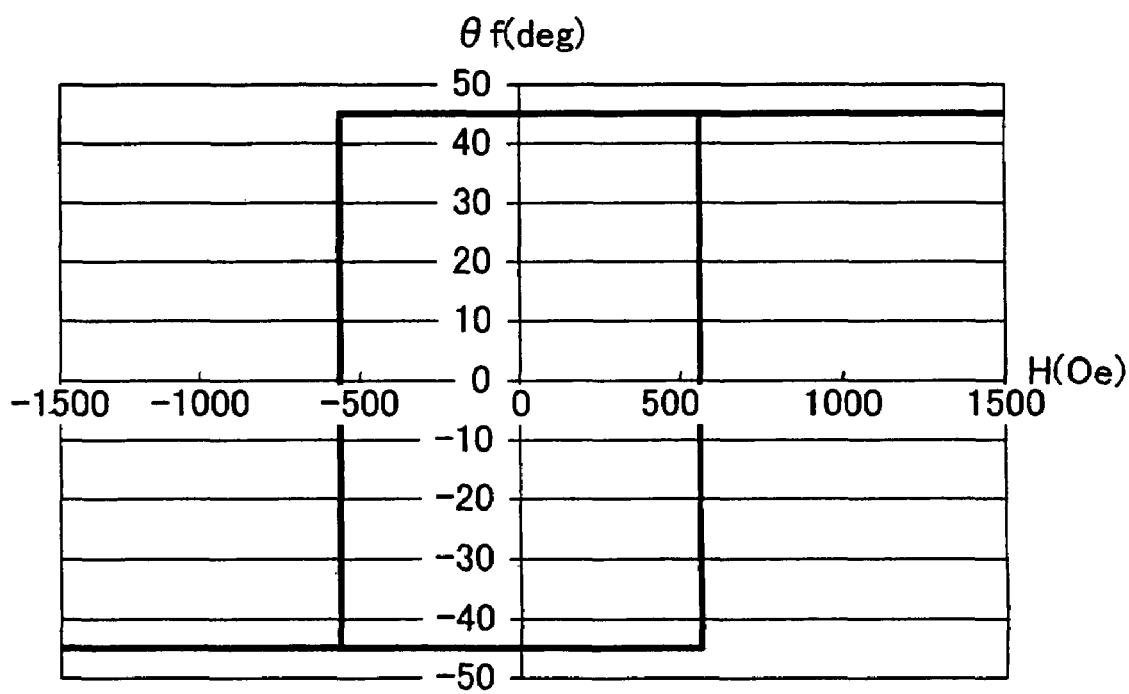
FIG. 5 illustrates a relationship between the magnetic garnet material manufactured in Embodiment 1, an external magnetic field and Faraday rotation angle.
Figure 6:
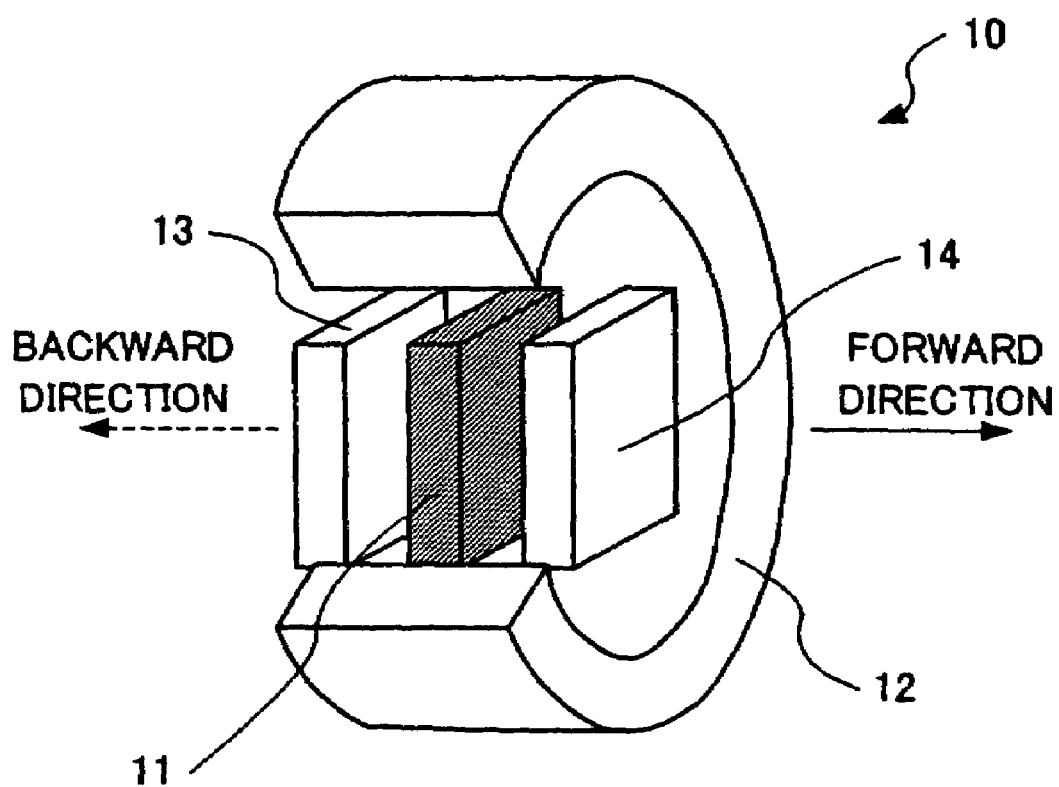
FIG. 6 illustrates a configuration of a conventional optical isolator.
Figure 7A:
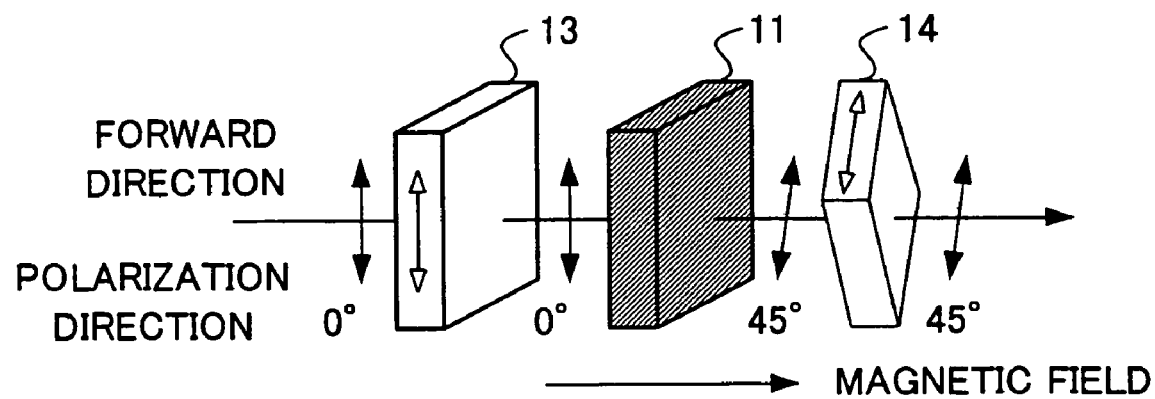
FIG. 7 illustrates principles of an optical isolator.
Figure 7B:
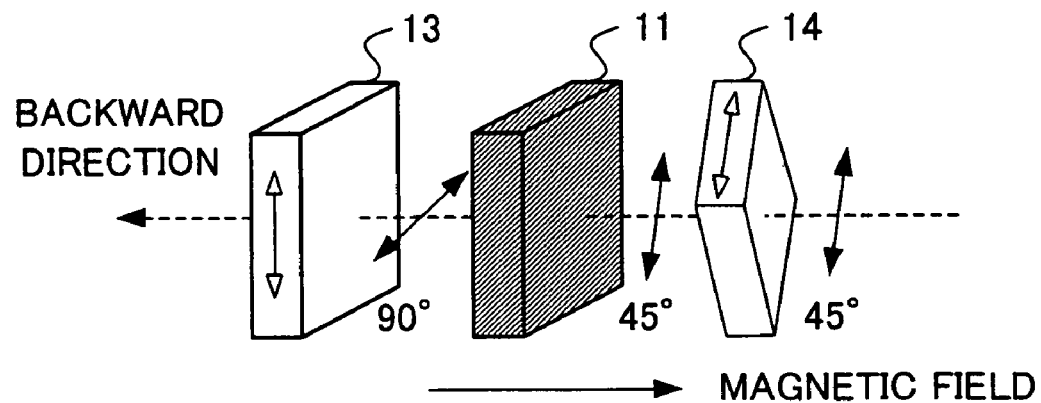

Furthermore, after applying an external magnetic field of intensity equal to or greater than saturation magnetization, Faraday rotary moment, temperature property, wavelength property and insertion loss were measured using a Faraday rotation angle measuring instrument. The results are shown in FIG. 5 and FIG. 9 together. By the way, this single crystal is created so as to have a rotation angle of 45°. Therefore, its target value for the temperature property and wavelength property is 45°. Furthermore, the Faraday rotary moment and its temperature property were measured in a temperature range of −40° C. to +85° C. with a wavelength of 1550 nm and the wavelength property of the Faraday rotation angle was measured at room temperature with a wavelength of 1500 to 1600 nm. Furthermore, insertion loss is measured at room temperature with a wavelength of 1550 nm (the same applies to Embodiment 2 and Embodiment 3). With regard to the temperature property and wavelength property, values (°/° C.) and (°/nm) which are frequently used for its assessment are also shown together (the same applies to Embodiment 2 and Embodiment 3).

As shown in FIG. 5, the Faraday rotary moment of sample No. 1 does not change even if an external magnetic field is removed and the single crystal of sample No. 1 exhibits rectangular hysteresis even after the external magnetic field is removed.

In FIG. 9, sample No. 1 is a Bi-substituted rare earth iron garnet single crystal of the present invention containing Gd, Tb and Yb as rare earth elements. On the other hand, samples No. 2 to 4 are different from sample No. 1 of the present invention in that they do not contain Gd, Tb and Yb, respectively. Furthermore, samples No. 5 to 8 are single crystals equivalent to the single crystals disclosed in Japanese Patent Laid-Open No. 6-222311, Japanese Patent Laid-Open No. 9-185027, Japanese Patent Laid-Open No. 9-328398 and Japanese Patent Laid-Open No. 10-31112.

When sample No. 1 is compared with samples No. 2 to 4, the following points can be noted. That is, sample No. 2 which contains no Gd is inferior to sample No. 1 in terms of insertion loss. On the other hand, sample No. 3 which contains no Tb is inferior to sample No. 1 in terms of temperature property and wavelength property. Furthermore, sample No. 4 which contains no Yb has insufficient Faraday rotary moment.

On the other hand, sample No. 5 is inferior in wavelength property, sample No. 6 is inferior in temperature property and wavelength property, sample No. 7 is inferior in insertion loss and sample No. 8 is inferior in temperature property to sample No. 1.

Compared to above described samples No. 2 to 8, the single crystal of sample No. 1 of the present invention exhibits excellent values in all Faraday rotary moment, temperature property, wavelength property and insertion loss, which leads to a realization that it is necessary to include rare earth elements Gd, Tb and Yb as essential components.

As a result of optimizing the chemical composition and the growth condition, a Bi-substituted rare earth iron garnet single crystal (No. 9) having a chemical composition of $Bi_{1.0}Gd_{0.3}Tb_{1.4}Yb_{0.3}Fe_{4.3}Ga_{0.7}O_{12.0}$.

After polishing this single crystal (No. 9) to 500 μm, its magnetic properties were measured using a VSM (vibration sample magnetometer). As a result, the single crystal of sample No. 9 exhibited coercive force of 2000 Oe with exhibiting excellent rectangular hysteresis. Furthermore, after applying an external magnetic field of intensity equal to or greater than saturation magnetization to this signal crystal, Faraday rotary moment, temperature property, wavelength property and insertion loss were measured using a Faraday rotation angle measuring instrument. The results are shown in FIG. 9. By the way, the Faraday rotary moment and temperature property were measured in a temperature range of −40° C. to +85° C. with a wavelength of 1550 nm and the wavelength property of the Faraday rotation angle was measured at room temperature with a wavelength of 1500 nm to 1600 nm. Furthermore, insertion loss was measured at room temperature with a wavelength of 1550 nm.

Here, sample No. 1 and sample No. 9 according to the present invention are compared. The insertion loss of sample No. 9 whose chemical composition has been optimized is 0.07 dB which is the same as the insertion loss of sample No. 1 and sample No. 9 shows better Faraday rotary moment, temperature property and wavelength property than those of sample No. 1. Thus, it has been confirmed that optimizing the chemical composition within a range recommended by the present invention makes it possible to obtain a higher performance Faraday rotator.

Embodiment 2

Using the same technique as that of Embodiment 1, the four kinds of Bi-substituted rare earth iron garnet single crystal shown in FIG. 10 were obtained. By the way, sample No. 1 in FIG. 10 is the single crystal created in Embodiment 1. Faraday rotary moment, temperature property, wavelength property and insertion loss of these single crystals were measured as in the case of Embodiment 1. The results are shown in FIG. 10.

When No. 1, No. 10 and No. 11 are compared from the standpoint of chemical composition, No. 1 has a greater content of Tb than No. 10 and No. 11. Furthermore, No. 10 has a greater content of Gd than No. 1 and No. 11. Furthermore, No. 11 has a greater content of Bi than No. 1 and No. 10.

When the measured properties are compared bearing the above-described chemical composition differences in mind, first, increasing the content of Tb (No. 1) can be said to improve the temperature property and wavelength property. Furthermore, increasing the content of Gd (No. 10) can be said to improve insertion loss. Furthermore, increasing the content of Bi (No. 11) can be said to improve Faraday rotary moment.

No. 12 is a material whose Ga content is as low as 0.1, but exhibits no rectangular hysteresis and does not embody hard magnetism referred to in the present invention.

As shown above, the Bi-substituted rare earth iron garnet single crystal of the present invention can be a material that matches various characteristics required for the Faraday rotator by adjusting the contents of the component elements as appropriate.

Embodiment 3

Using the same technique as that of Embodiment 1, various kinds of Bi-substituted rare earth iron garnet single crystal shown in FIG. 11 were obtained. Faraday rotary moment, temperature property, wavelength property and insertion loss of these single crystals were measured as in the case of Embodiment 1. The results are shown in FIG. 11. Samples No. 13 to 21 exhibited Faraday rotary moment of 700°/cm or more in a temperature range of −40° C. to +85° C. with a wavelength of 1550 nm and insertion loss of 0.1 dB or less at room temperature with a wavelength of 1550 nm. Furthermore, it is observable that the results satisfy the characteristics that the temperature property of the Faraday rotation angle in a temperature range of −40° C. to +85° C. with a wavelength of 1550 nm is 13% or less of its target value and the wavelength property of the Faraday rotation angle at room temperature with a wavelength of 1500 nm to 1600 nm is 8% or less of its target value.

Embodiment 4

Using the same technique as that of Embodiment 1, a Bi-substituted rare earth iron garnet single crystal having a chemical composition of $Bi_{1.0}Gd_{0.6}Tb_{1.0}Yb_{0.4}Fe_{4.1}Ga_{0.9}O_{12.0}$ was obtained. From this single crystal, 10 samples each having a size of 1.0×1.0 mm were obtained and their magnetic properties were measured using a VSM (vibration sample magnetometer). As a result, the samples exhibited 4πMs of 80 G, coercive force of 200 to 400 Oe. Furthermore, their magnetic type was hard magnetic and all samples showed rectangular hysteresis. In this embodiment, coercive force indicates a value at room temperature and the same applies to the following embodiments.

5 of the 10 samples were subjected to magnetic heat treatment by holding them in air at 800° C., with an external magnetic field of 3 kOe for 5 hours. Then, while continuing application of the external magnetic field of 3 kOe, the samples were cooled down to the room temperature and their magnetic properties were measured using a VSM (vibration sample magnetometer). Hereafter, these 5 samples will be referred to as samples No. 22 to 26.

On the other hand, the remaining 5 samples were subjected to heat treatment (heating only) without applying external magnetic field and their magnetic properties were measured using a VSM (vibration sample magnetometer). Hereafter, these 5 samples will be referred to as samples No. 27 to 31. By the way, heat treatment conditions of samples No. 27 to 31 were set to 800° C. in air and 5 hours as in the case of samples No. 22 to 26.

While coercive force of samples No. 27 to 31 (heating only) was 400 to 600 Oe, the coercive force of samples No. 22 to 26 (magnetic heat treatment) was 950 to 1050 Oe, all exhibiting coercive force of 900 Oe or more. That is, samples No. 22 to 26 to which magnetic heat treatment was applied are said to exhibit coercive force 4 times as high as that (200 to 400 Oe) of the same samples before magnetic heat treatment.

Furthermore, the coercive force of the sample exhibiting the highest coercive force among samples No. 27 to 31 (heating only) was 600 Oe and the coercive force of the sample exhibiting the lowest coercive force among them was 400 Oe. That is, samples No. 27 to 31 each had a large dispersion of coercive force of 200 Oe. Here, considering the fact that a dispersion of coercive force before heat treatment is 200 Oe, it can be said that simply applying heat treatment (heating only) cannot reduce dispersions of individual coercive forces.

On the other hand, dispersions of individual coercive forces of samples No. 22 to 26 (magnetic heat treatment) were 100 Oe. Thus, it has been discovered that magnetic heat treatment was effective not only in improving coercive force but also in reducing dispersions of coercive force.

Figure 12A:
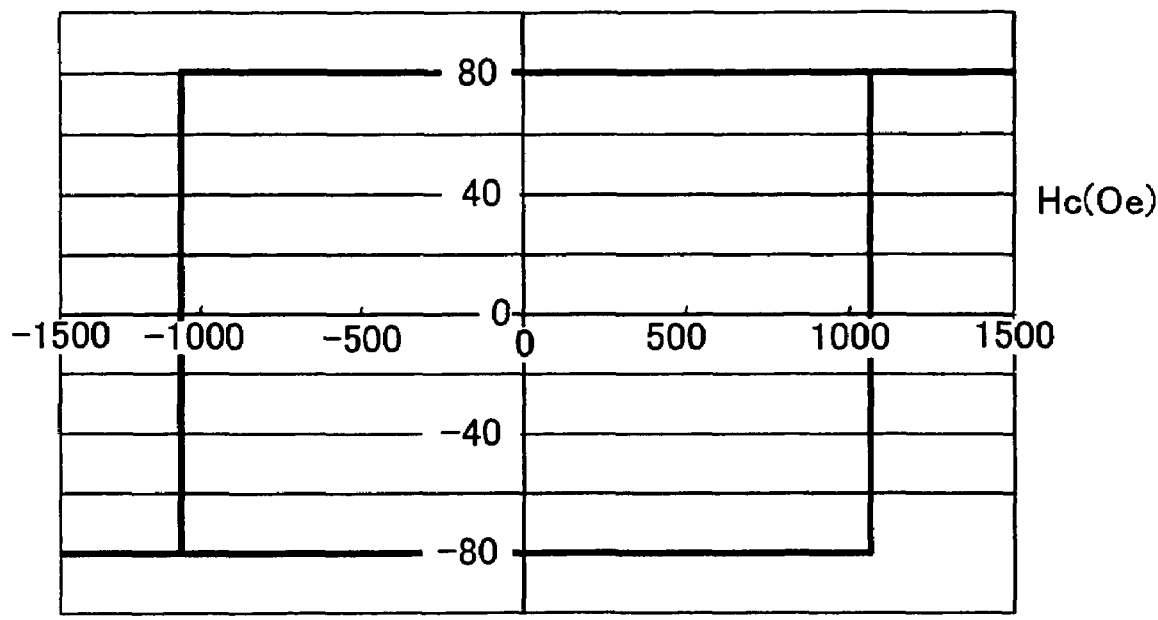
FIG. 12A illustrates magnetic hysteresis of sample No. 26 (4πMs=80 G, coercive force=1050 Oe) subjected to magnetic heat treatment
Figure 12B:
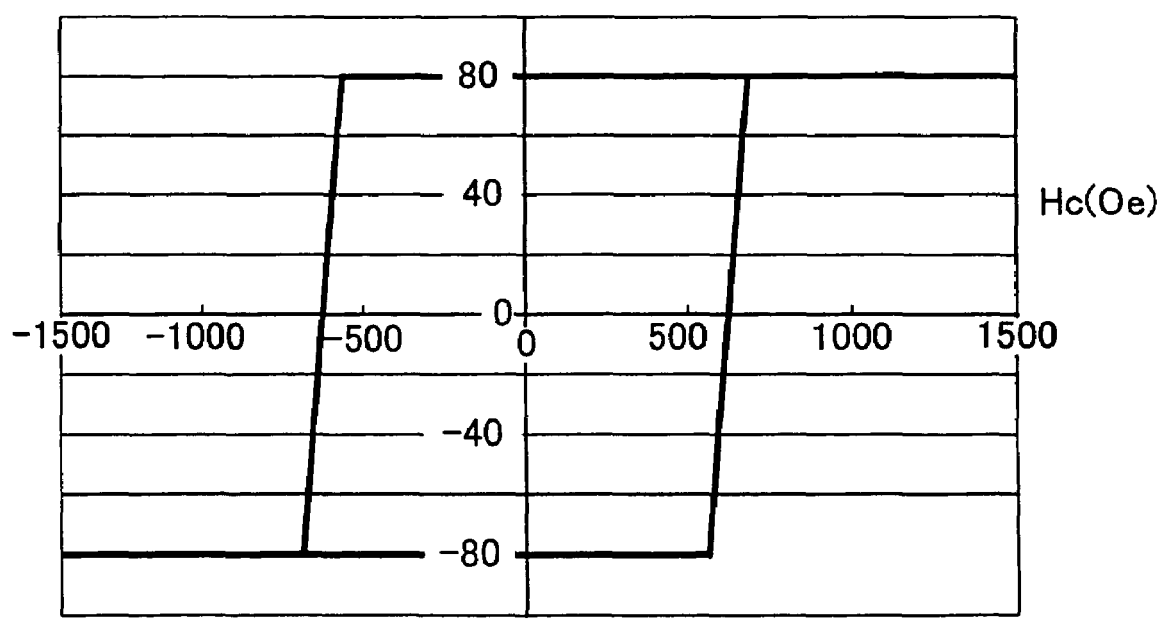
FIG. 12B illustrates magnetic hysteresis of sample No. 30 only subjected to heat treatment.

Then, magnetic hysteresis of sample No. 26 (4πMs=80 G, coercive force=1050 Oe) subjected to magnetic heat treatment is shown in FIG. 12A and magnetic hysteresis of sample No. 30 (4πMs=80 G, coercive force=600 Oe) subjected to only heat treatment is shown in FIG. 12B.

As shown in FIG. 12, sample No. 26 has four angles of nearly 90° and exhibited rectangular magnetic hysteresis having an ideal form. On the other hand, it has been confirmed that sample No. 30 exhibited rectangular magnetic hysteresis, but the four angles were 85 to 90°.

The above results show that applying magnetic heat treatment causes magnetic hysteresis to exhibit an ideal rectangle. It has also been confirmed that magnetic heat treatment is extremely effective in improving coercive force and reducing dispersions in coercive force among samples. Moreover, when magnetic heat treatment is conducted, it is possible to stably obtain a Bi-substituted rare earth iron garnet single crystal having coercive force of 900 Oe or more.

Embodiment 5

An experiment conducted to confirm a dispersion in the magnetic properties accompanying a dispersion in a heat treatment-temperature will be explained as Embodiment 5.

Using the same technique as that of Embodiment 1, a Bi-substituted rare earth iron garnet single crystal having a chemical composition of $Bi_{1.0}Gd_{0.6}Tb_{1.0}Yb_{0.4}Fe_{4.1}Ga_{0.9}O_{12.0}$ was obtained. From this single crystal, 8 samples of 1 mm per side were obtained and their magnetic properties were measured using a VSM (vibration sample magnetometer). As a result, the samples exhibited 4πMs of 80 G, coercive force of 200 to 400 Oe. Furthermore, their magnetic type was hard magnetic and all samples showed rectangular hysteresis.

Figure 13:
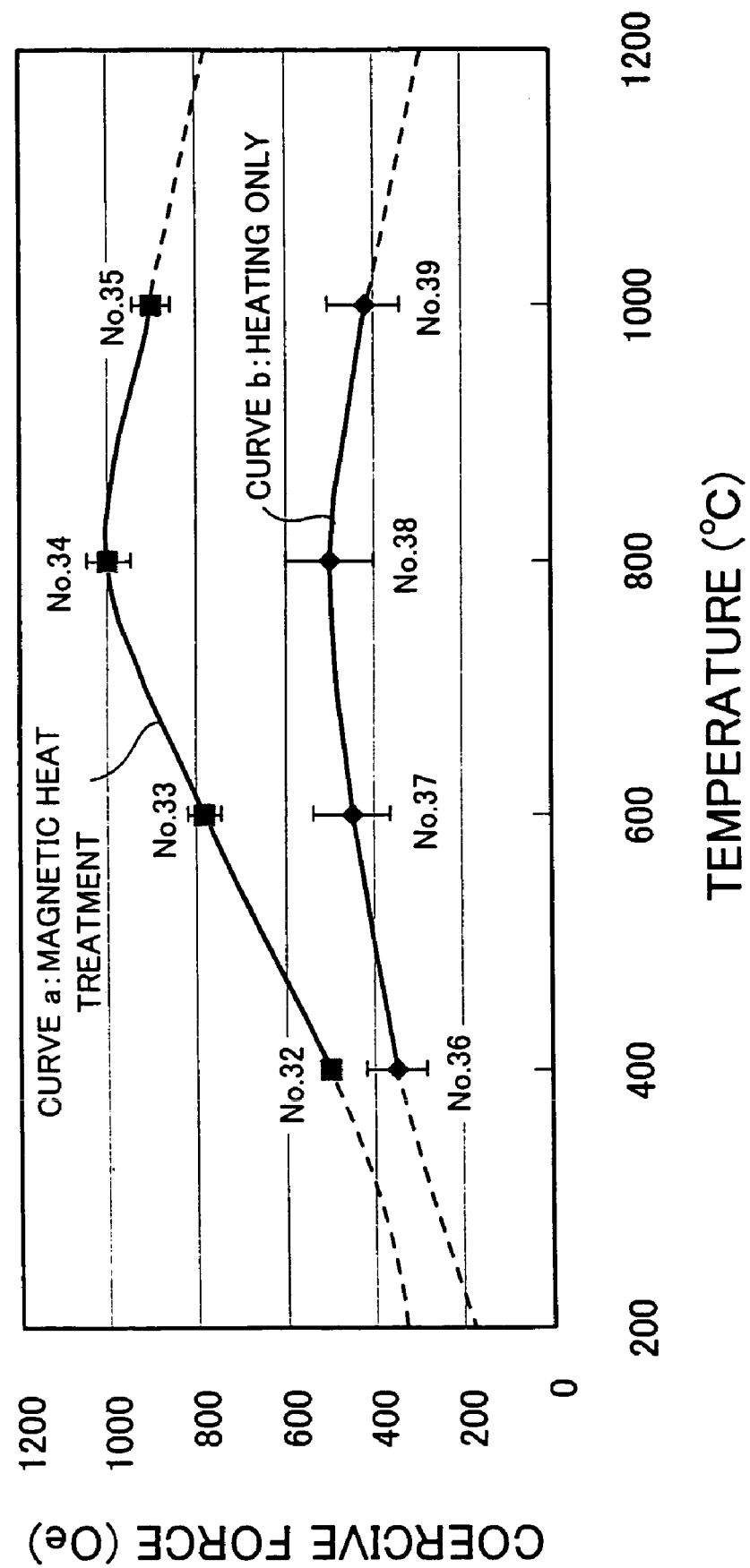
FIG. 13 illustrates that a coercive force varies as a magnetic heat treatment temperature changes.

4 samples (No. 32 to 35) of the 8 samples were subjected to magnetic heat treatment by holding them in an external magnetic field of 3 kOe for 5 hours. Then, while continuing application of the external magnetic field of 3 kOe, the samples were cooled down to the room temperature and their magnetic properties were measured using a VSM (vibration sample magnetometer). The heat treatment temperatures were as follows and heat treatment was conducted in air. Coercive forces of samples No. 32 to 35 are shown in FIG. 13. On the other hand, the remaining 4 samples (samples No. 36 to 39) were subjected to only heat treatment under the following conditions and their magnetic properties were measured using a VSM (vibration sample magnetometer). The coercive forces of samples No. 36 to 39 are also shown in FIG. 13.

<Heat Treatment Temperature>
Samples No. 32, 36: 400° C.
Samples No. 33, 37: 600° C.
Samples No. 34, 38: 800° C.
Samples No. 35, 39: 1000° C.

Hereafter, a curve described by samples No. 32 to 35 subjected to magnetic heat treatment will be referred to as "curve a" and a curve described by samples No. 36 to 39 subjected to only heat treatment will be referred to as "curve b".

In FIG. 13, samples No. 32 to 35 subjected to magnetic heat treatment all-exhibit better coercive forces than samples No. 36 to 39 subjected to only heat treatment at all temperatures of 400° C., 600° C., 800° C. and 1000° C. That is, the same tendency as that in Embodiment 4 has been confirmed.

Here, both "curve a" (magnetic heat treatment) and "curve b" (heating only) show a peak of coercive force when the heat treatment temperature comes close to 800° C. While the peak value of curve a is approximately 1000 Oe, the peak value of curve b is only approximately 500 Oe. Thus, even if the heat treatment temperature is set to an appropriate range, it is difficult to keep coercive force at 600 Oe or more by only heating. On the other hand, when magnetic heat treatment is applied, coercive force reaches 600 Oe or more when the heat treatment temperature comes close to 500° C. and excellent coercive force of 800 Oe or more is observed when the heat treatment temperature is 600° C. or higher.

From the above-described result, it has been confirmed that when magnetic heat treatment is applied, it is possible to obtain excellent coercive force of 600 Oe or more. In this embodiment, a heat treatment temperature during magnetic heat treatment is preferably 300 to 1100° C., or more preferably 500 to 1000° C., or still more preferably 700 to 900° C.

Embodiment 6

An experiment conducted to confirm a dispersion in the magnetic properties accompanying a dispersion in an external magnetic field will be explained as Embodiment 6.

Using the same technique as that of Embodiment 1, a Bi-substituted rare earth iron garnet single crystal having a chemical composition of $Bi_{1.0}Gd_{0.6}Tb_{1.0}Yb_{0.4}Fe_{4.1}Ga_{0.9}O_{12.0}$ was obtained. From this single crystal, 4 samples of 1 mm per side were obtained and their magnetic properties were measured using a VSM (vibration sample magnetometer). As a result, the samples exhibited 4πMs of 80 G, coercive force of 500 Oe. Furthermore, their magnetic type was hard magnetic and all samples showed rectangular hysteresis.

These 4 samples were subjected to magnetic heat treatment by fixing a magnetic heat treatment temperature to 800° C. and changing an external magnetic field to 1 kOe (sample No. 40), 2 kOe (sample No. 41), 3 kOe (sample No. 42) and 5 kOe (sample No. 43). The magnetic heat treatment hours of samples No. 40 to 43 were each 5 hours and magnetic heat treatment was conducted in air. After the magnetic heat treatment, while continuing application of the external magnetic field, the samples were cooled down to the room temperature. After cooling, magnetic properties of samples 40 to 43 were measured using a VSM (vibration sample magnetometer). The result showed that 4πMs was 80. Coercive forces of sample No. 40 to 43 are shown in FIG. 14.

Figure 14:
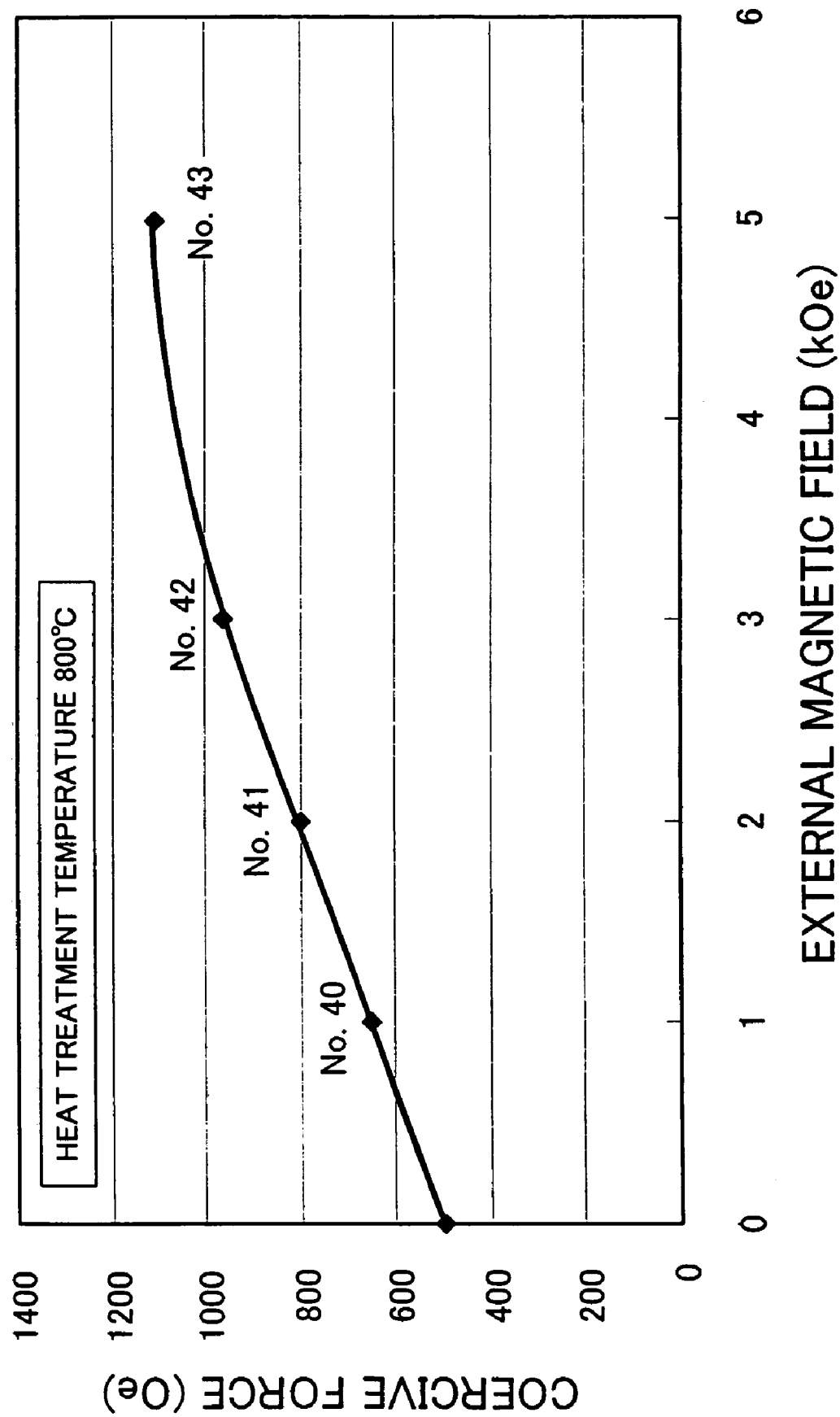
FIG. 14 illustrates that a coercive force varies as an external magnetic field changes.

As shown in FIG. 14, the coercive force improves as the intensity of the external magnetic field increases to 1 kOe (No. 40), 2 kOe (sample No. 41), 3 kOe (sample No. 42) and 5 kOe (sample No. 43). Here, the coercive force is approximately 600 Oe when the intensity of the external magnetic field is close to 1 kOe, approximately 800 Oe when the intensity of the external magnetic field is close to 2 kOe and approximately 950 Oe when the intensity of the external magnetic field is close to 3 kOe.

From the above results, it has been confirmed that the higher the intensity of the external magnetic field during magnetic heat treatment, the more excellent coercive force can be obtained. Furthermore, when the magnetic heat treatment temperature is set to within an appropriate range and the intensity of the external magnetic field is set to 1 kOe or more, it has been proven that it is possible to obtain coercive force of 600 Oe or more.

Embodiment 7

An experiment conducted to confirm yield when a hard magnetic single crystal is cut using a wire saw will be explained as Embodiment 7.

Using the same technique as that of Embodiment 1, a Bi-substituted rare earth iron garnet single crystal having a chemical composition of $Bi_{1.0}Gd_{0.6}Tb_{1.0}Yb_{0.4}Fe_{4.0}Ga_{1.0}O_{12.0}$ was obtained. After magnetizing the single crystal in an external magnetic field of 10 kOe obtained in this way, its magnetic properties were measured using a VSM (vibration sample magnetometer). As a result, the sample exhibited 4πMs of 80 G, coercive force of 300 Oe. Furthermore, its magnetic type was hard magnetic and the sample showed rectangular hysteresis. In this example, the coercive force was measured at room temperature and the same applied to the following embodiments.

Then, using a wire saw and dicing machine, 50 samples were each extracted from one wafer. The size of each sample extracted is 1.0×1.0 mm, 500 μm thick. Furthermore, the cutting condition by the wire saw was as follows.

Cutting Condition by the Wire Saw
  Wire diameter: 0.14 mm
  Mean abrasive grain size: 13 μm
  Wire saw running direction: reciprocal running
  Running speed: 400 m/min As a result, in the case of cutting by the dicing machine, yield was 80%. When the coercive force was measured using a VSM after the cutting, a coercive force of 300±25%

Oe was obtained. That is, a dispersion of each coercive force was as high as about 25% and a low coercive force was as low as about 225 Oe.

On the other hand, in the case of cutting by the wire saw, yield was 96%. When the coercive force was measured using a VSM after the cutting, a coercive force of 400±5% Oe was obtained. Thus, after the cutting the coercive force increased and this is possibly attributable to the fact that the influence from the diamagnetic field was small and therefore an apparent coercive force increased. Moreover, it has been confirmed that all samples exhibited satisfactory coercive force of 350 Oe or more and the dispersion of each coercive force was as small as about 5%.

Then, sections of samples cut by the wire saw and sections of samples cut by the dicing machine were observed using a microscope. A section of a sample cut by the wire saw is shown in FIG. 15A and a section of a sample cut by the dicing machine is shown in FIG. 15B.

Figure 15A:
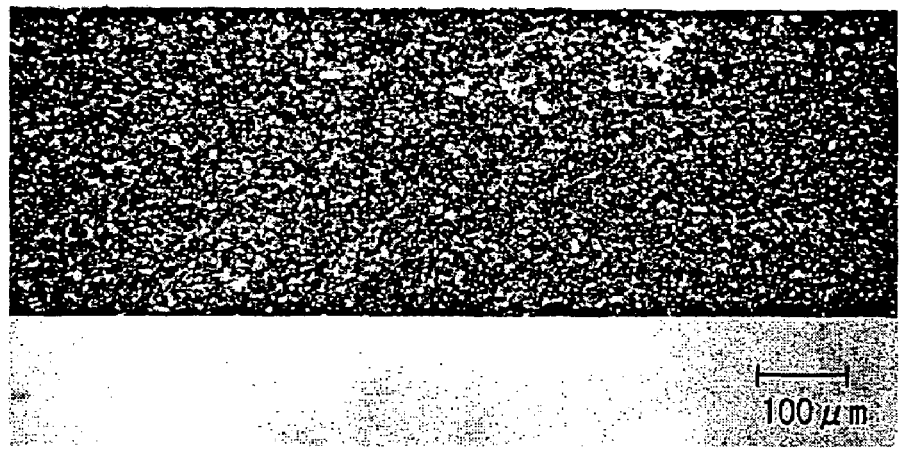
FIG. 15A illustrates a section of a sample cut by a wire saw and FIG. 15B illustrates a section of a sample cut by a dicing machine.

As is shown in FIG. 15A, when a hard magnetic single crystal was cut by the wire saw, fine projections and depressions are formed uniformly on the section. Moreover, judging from only this section, the cutting direction cannot be distinguished and in that sense the section can be said to be isotropic. Moreover, as shown in FIG. 15A, almost no chipping is observed even at edges.

Figure 15B:
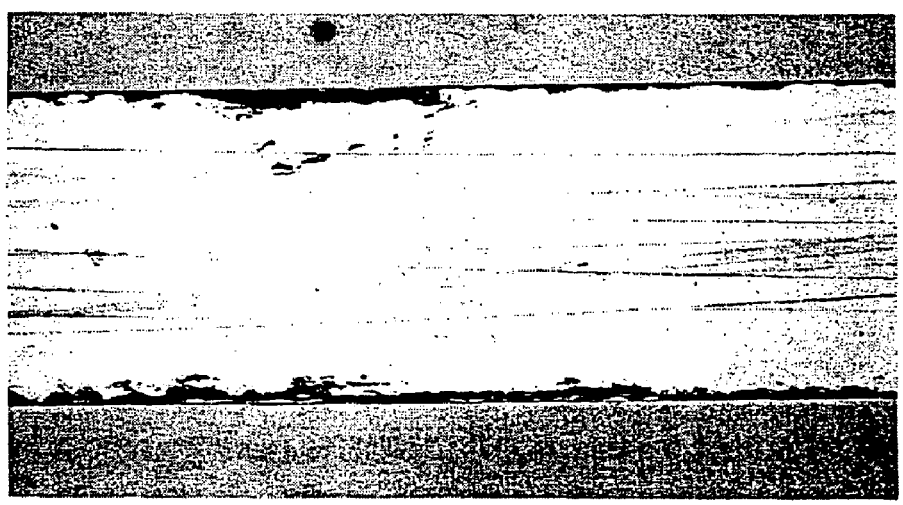

On the other hand, when a hard magnetic single crystal was cut by the dicing machine as shown in FIG. 15B, directional striped patterns are formed on the section. Many such striped patterns were observed in the center in the thickness direction of the single crystal. Furthermore, as shown in FIG. 15B, it has been confirmed that a plurality of chippings occurred at edges.

From the above-described results, it has been confirmed that cutting the hard magnetic single crystal using the wire saw can improve coercive force and reduce dispersions among samples. On the other hand, it has been confirmed that cutting the hard magnetic single crystal using the wire saw can reduce chipping and improve yield.

Embodiment 8

An experiment conducted to confirm yield when a hard magnetic single crystal is adhered to a glass polarizer and then cut will be explained as Embodiment 8.

Figure 3B:
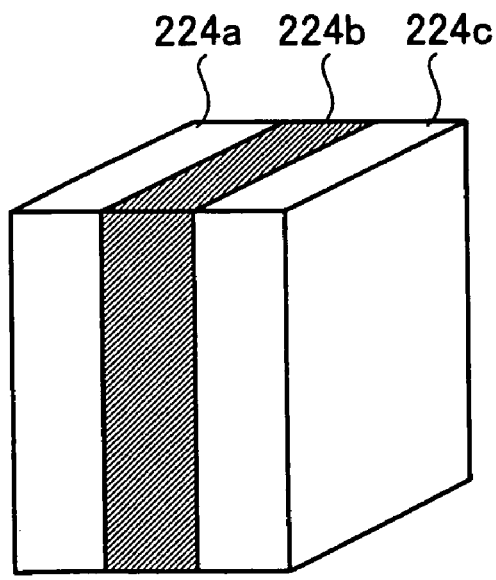

The single crystal (Faraday rotator 224b) obtained in Embodiment 8 was adhered to the polarizers 224a and 224c using resin according to the procedure shown in FIG. 3B. Then, 50 samples were each extracted from the single crystal to which the polarizers 224a and 224c were adhered using the wire saw and dicing machine. The size of each sample extracted is 1.0×1.0 mm and 500 μm thick. Furthermore, the cutting condition using the wire saw was the same as that in Embodiment 7.

After the cutting by the wire saw, the coercive force was measured using a VSM and the result showed that the coercive force was 430±2.5% Oe.

On the other hand, after the cutting by the dicing machine, the coercive force was measured using the VSM and the result showed that the coercive force was 330±15% Oe.

From the above-described result, it has been confirmed that when the hard magnetic single crystal was adhered to a glass polarizer and then cut by the wire saw, it was possible to obtain a coercive force by approximately 100 Oe higher than when it was cut by the dicing machine and that dispersions of coercive force among samples were very small.

Embodiment 9

An experiment conducted to confirm yield when a soft magnetic single crystal is cut using a wire saw will be explained as Embodiment 9.

Using the same technique as that of Embodiment 1 except using bismuth oxide ($Bi_2O_3$, 4N), ferric oxide ($Fe_2O_3$, 4N), holmium oxide ($Ho_2O_3$, 3N), terbium oxide ($Tb_4O_7$, 3N) and aluminum oxide ($Al_2O_3$, 3N) as raw materials, one kind of Bi-substituted rare earth iron garnet single crystal was obtained. The chemical composition of the single crystal obtained was analyzed and the result showed that the chemical composition was $Bi_{1.3}Tb_{1.3}Ho_{0.4}Fe_{4.9}Al_{0.1}O_{12.0}$. Furthermore, the magnetic type of this single crystal was soft magnetic. Using a wire saw and dicing machine, 50 samples were each extracted from one wafer. The size of each sample extracted is 1.0×1.0 mm, 500 μm thick. Furthermore, the cutting condition by the wire saw was the same as that in Embodiment 7.

As a result, in the case of the cutting using the wire saw, yield was 96%. On the other hand, in the case of the cutting using the dicing machine, yield was 80%. By the way, yield is based on the size and amount of chipping.

From the above-described result, it has been confirmed that cutting the single crystal using the wire saw improved yield drastically compared to the cutting using the dicing machine.

Embodiment 10

An experiment conducted to confirm yield when a soft magnetic single crystal is adhered to a glass polarizer and then cut will be explained as Embodiment 10.

The single crystal (Faraday rotator 224b) obtained in Embodiment 9 was adhered to the polarizers 224a and 224c according to the procedure shown in FIG. 3B. Then, the single crystal to which the polarizers 224a and 224c were adhered was cut into 50 samples each having a size of 1.0×1.0 mm, 500 μm thick using the wire saw under the same condition as that in Embodiment 8. As a result, yield was 100%.

On the other hand, as a result of cutting the single crystal to which the polarizers 224a and 224c were adhered was cut into 50 samples each having a size of 1.0×1.0 mm, 500 μm thick using the dicing machine, yield was 90%.

From the above-described results, it has been confirmed that ideal yield is obtained when a soft magnetic single crystal is adhered to glass polarizers and then cut using the wire saw.

Embodiments 7 to 10 described above have clarified that cutting a Bi-substituted rare earth iron garnet single crystal using a wire saw is effective in chipping prevention, improvement of yield and improvement of coercive force. Furthermore, it has also been confirmed that cutting by the wire saw is also effective for both a soft magnetic material and hard magnetic material.

Furthermore, it has also been confirmed that cutting by the wire saw is also effective not only when a Bi-substituted rare earth iron garnet single crystal is cut independently but also when the Bi-substituted rare earth iron garnet single crystal is adhered to glass polarizers and then cut.

Therefore, cutting a Bi-substituted rare earth iron garnet single crystal or a Bi-substituted rare earth iron garnet single crystal adhered to glass polarizers using a wire saw can be said to contribute to chipping prevention, improvement of yield and improvement of coercive force.

By the way, Embodiments 8 and 10 have described the case where a Bi-substituted rare earth iron garnet single crystal is adhered to glass polarizers and then cut, but this is not limited to glass polarizers and the same effect can be expected when the Bi-substituted rare earth iron garnet single crystal is cut after being adhered to optical elements such as glass, birefringent pate glass and metal thin-film mirrors which are made of metal evaporated to glass, etc.

As described above, the present invention provides a hard magnetic Bi-substituted rare earth iron garnet material with excellent Faraday rotary moment, temperature property, wavelength property and insertion loss. Furthermore, a Faraday rotator using the hard magnetic Bi-substituted rare earth iron garnet material according to the present invention allows miniaturization and a cost reduction. Furthermore, when applied to an optical device, the Faraday rotator of the present invention, that is, Faraday rotator with excellent Faraday rotary moment, temperature property, wavelength property, insertion loss and coercive force can provide a high performance optical device. Furthermore, an optical communication system of the present invention using such an optical device can contribute to realization of a high quality optical communication.

Furthermore, the present invention provides a hard magnetic Bi-substituted rare earth iron garnet material with excellent coercive force, or more specifically, a hard magnetic Bi-substituted rare earth iron garnet single crystal.

What is claimed is:

1. A Faraday rotator that uses a bismuth-substituted rare earth iron garnet single crystal and rotates the polarization plane of incident light, said single crystal necessarily containing Gd, Tb and Yb as rare earth elements and exhibiting substantially rectangular magnetic hysteresis, wherein, Faraday rotary moment in a temperature range of −40° C. to +85° C. with a wavelength of 1550 nm, is 700°/cm or more and the temperature property of the Faraday rotation angle in said temperature range with said wavelength, is 13% or less of a target value thereof, the wavelength property of the Faraday rotation angle at room temperature with a wavelength of 1500 to 1600 nm, is 8% or less of a target value thereof, and insertion loss at room temperature with a wavelength of 1550 nm, is 0.1 dB or less.

2. A Faraday rotator according to claim 1, wherein said single crystal contains in addition to Gd, Tb and Yb, at least one element selected from the group consisting of La, Ce, Pr, Nd, Pm, Sm, Eu, Dy, Lu, Tm, Er, Ho, Y, and Ca.

3. A Faraday rotator according to claim 2, wherein Faraday rotary moment in a temperature range of −40° C. to +85° C. with a wavelength of 1550 nm, is 800°/cm or more.

4. A Faraday rotator according to claim 1, wherein said temperature property is 11% or less of a target value thereof.

5. A Faraday rotator according to claim 1, wherein said wavelength property is 7% or less of a target value thereof.

6. A Faraday rotator according to claim 1, wherein said insertion loss is 0.07 dB or less.

7. A Faraday rotator according to claim 1, wherein:

said bismuth-substituted rare earth iron garnet single crystal comprising front and back surfaces placed opposite to each other in a predetermined distance and sides formed around said front and back surfaces, wherein fine projections and depressions are formed uniformly on at least one side of said sides.

* * * * *